(12) United States Patent
Mansoor et al.

(10) Patent No.: US 12,541,409 B2
(45) Date of Patent: Feb. 3, 2026

(54) SUBSCRIPTION-BASED DATA DELIVERY SYSTEM

(71) Applicant: Hadean Supercomputing Ltd, London (GB)

(72) Inventors: Rashid Mohamed Mansoor, London (GB); James Kay, London (GB); Christopher Sinclair, London (GB); Douglas Wilson, London (GB)

(73) Assignee: Hadean Supercomputing Ltd, London (GB)

( * ) Notice: Subject to any disclaimer, the term of this patent is extended or adjusted under 35 U.S.C. 154(b) by 476 days.

(21) Appl. No.: 18/251,230

(22) PCT Filed: Oct. 27, 2021

(86) PCT No.: PCT/EP2021/079902
§ 371 (c)(1),
(2) Date: Apr. 28, 2023

(87) PCT Pub. No.: WO2022/090354
PCT Pub. Date: May 5, 2022

(65) Prior Publication Data
US 2023/0409414 A1 Dec. 21, 2023

(30) Foreign Application Priority Data
Oct. 30, 2020 (EP) .................................. 20204927

(51) Int. Cl.
*G06F 9/54* (2006.01)
*G06F 16/9535* (2019.01)

(52) U.S. Cl.
CPC .......... *G06F 9/542* (2013.01); *G06F 16/9535* (2019.01)

(58) Field of Classification Search
CPC ..... G06F 9/542; G06F 16/1734; H04L 41/06; H04L 41/0604
See application file for complete search history.

(56) References Cited

U.S. PATENT DOCUMENTS

| 7,177,859 | B2 | 2/2007 | Pather et al. |
| 10,104,049 | B2 * | 10/2018 | Hamilton ................ G06F 9/542 |
| 11,178,243 | B2 * | 11/2021 | Jensen ................ G06F 11/3013 |
| 11,822,924 | B2 * | 11/2023 | Otenko .................. G06F 9/546 |

(Continued)

FOREIGN PATENT DOCUMENTS

WO 2020112793 A2 6/2020

OTHER PUBLICATIONS

EP Office Action Mailed on Mar. 17, 2022 for EP Application No. 20204927, 6 page(s).

(Continued)

*Primary Examiner* — Andy Ho
(74) *Attorney, Agent, or Firm* — Hamilton, Brook, Smith & Reynolds, P.C.

(57) ABSTRACT

There is provided a computer-implemented method comprising, at an intermediary process acting as an intermediary between a publisher system and a plurality of subscriber processes, the intermediary process having a publisher data store storing one or more subscriptions for which the intermediary process is a publisher and a subscriber data store storing one or more subscriptions for which the intermediary process is a subscriber.

20 Claims, 13 Drawing Sheets

(56) References Cited

U.S. PATENT DOCUMENTS

2006/0047666 A1    3/2006    Bedi et al.
2006/0069587 A1    3/2006    Banks et al.

OTHER PUBLICATIONS

European search report Mailed on Apr. 16, 2021 for EP Application No. 20204927, 8 page(s).

European search report Mailed on Jan. 22, 2024 for EP Application No. 23200803, 8 page(s).

Outgoing—ISA/210—International Search Report Mailed on Feb. 3, 2022 for WO Application No. PCT/EP21/079902, 10 page(s).

Summons to attend oral proceedings to Rule 115(1) Epc, Ep 20204927.6, dated Sep. 19, 2022.

Wikipedia, "Content delivery network", available online at: <https://en.wikipedia.org/w/index.php?title=Content_delivery_network&oldid=985979272>, Oct. 29, 2020, 8 pages.

Wikipedia, "Minimum bounding box", available online at: <https://en.wikipedia.org/w/index.php?title=Minimum_bounding_box&oldid=981946359>, Oct. 5, 2020, 2 pages.

Wikipedia, "Multiple buffering", available online at: <https://en.wikipedia.org/w/index.php?title=Multiple_buffering&oldid=940627830>, Feb. 13, 2020, 3 pages.

Wikipedia, "Proxy server", available online at: <https://en.wikipedia.org/w/index.php?title=Proxy_server&oldid=985866889>, Oct. 28, 2020, 8 pages.

Wikipedia, "Push technology", available online at: <https://en.wikipedia.org/w/index.php?title=Push_technology&oldid=985534293>, Oct. 26, 2020, 4 pages.

Wikipedia, "Spatial database", available online at: <https://en.wikipedia.org/w/index.php?title=Spatial_database&oldid=977730239>, Sep. 10, 2020, 4 pages.

Wikipedia, "Web cache", available online at: <https://en.wikipedia.org/w/index.php?title=Web_cache&oldid=984732223>, Oct. 21, 2020, 2 pages.

International Search Report and Written Opinion for PCT/EP2021/079902, Feb. 3, 2022.

* cited by examiner

SUBSCRIPTION-BASED DATA DELIVERY SYSTEM

This application is the U.S. National Stage of International Application No. PCT/EP2021/079902, filed Oct. 27, 2021, which designates the U.S., published in English, and claims priority under 35 U.S.C. § 119 or 365 (c) to European Application No. 20204927.6, filed Oct. 30, 2020. The entire teachings of the above applications are incorporated herein by reference.

FIELD

The present disclosure relates to a subscription-based data delivery system.

BACKGROUND

A number of subscribers may wish to subscribe to a customised view of a large, volatile data set provided by a publisher, and receive updates when the data set is updated. However, as the number of subscribers increases, the publisher may become overloaded with connections and unable to provide the data with acceptable latency bounds.

SUMMARY

Aspects of the present disclosure are defined in the accompanying independent claims.

OVERVIEW OF DISCLOSURE

There is provided a computer-implemented method performed at an intermediary process acting as an intermediary between a publisher system and a plurality of subscriber processes.

Optionally, the intermediary process has a publisher data store storing one or more subscriptions for which the intermediary process is a publisher.

Optionally, the intermediary process has a subscriber data store storing one or more subscriptions for which the intermediary process is a subscriber.

Optionally, the intermediary process has a state data store storing state data.

Optionally, the method comprises receiving, from a first one of the plurality of subscriber processes, a first subscription request comprising a first subscription for the first subscriber process.

Optionally, the method comprises storing, in the publisher data store, a record associating the first subscriber process with the first subscription.

Optionally, the method comprises determining whether the one or more subscriptions in the subscriber data store collectively cover the first subscription.

Optionally, the method comprises, responsive to (or conditional upon) determining that the one or more subscriptions in the subscriber data store do not collectively cover at least a portion of the first subscription, sending, to the publisher system, a second subscription request comprising a second subscription for the intermediary process, the second subscription comprising at least the at least a portion of the first subscription, and, further optionally, storing, in the subscriber data store, a record of the second subscription.

Optionally, the method further comprises:
receiving first event data from the publisher system; and
updating the state data in the state data store based on the first event data.

Optionally, the method further comprises:
generating, from the state data in the state data store, second event data according to the subscription associated with the first subscriber process in the publisher data store; and
sending the second event data to the first subscriber process.

Optionally, the state data is updated using a double buffering technique.

Optionally, the state data store comprises an active state data store and an inert state data store, the second event data is generated from the state data in the active state data store, and updating the state data comprises:
updating the state data in the inert state data store based on the first event data;
atomically swapping the inert state data store and the active state data stores; and
updating the state data in the inert state data store to match the state data in the active state data store.

Optionally, the method further comprises repeating the generating and/or sending of the second event data.

Optionally, the generating and/or sending of the second event data is repeated at a rate that is specific to the first subscriber process.

Optionally, the sending of the second event data is initiated by the intermediary process.

Optionally, the method further comprises:
receiving, from a second one of the plurality of subscriber processes, a third subscription request comprising a third subscription for the second subscriber process;
storing, in the publisher data store, a record associating the second subscriber process with the third subscription;
determining that the one or more subscriptions in the subscriber data store collectively cover the third subscription;
subsequent to updating the state data, generating, from the state data in the state data store, fourth event data according to the subscription associated with the second subscriber process in the publisher data store; and
sending the fourth event data to the second subscriber process.

Optionally, the method further comprises:
subsequent to updating the state data, receiving third event data from the publisher system; and
updating the state data in the state data store based on the third event data,
wherein the generating is subsequent to updating the state data based on the third event data.

Optionally, the first subscription request comprises an indication of computing capabilities of the first subscriber process and wherein generating the second event data comprises adapting the second event data to the computing capabilities of the first subscriber process.

Optionally, generating the second event data from the state data comprises selecting a portion of the state data according to the subscription associated with the first subscriber process in the publisher data store.

Optionally, the second subscription comprises the subscriptions stored in the subscriber data store.

Optionally, the second subscription further comprises an additional subscription for content or data neighbouring the first subscription.

Optionally, the subscriptions are for content or data in a particular region of a space, the method further comprising determining a bounding box for the subscriptions stored in the subscriber data store, and the second subscription comprises the bounding box.

Optionally, the first subscription comprises a query for selecting data from a database, the method further comprises decomposing the query into a plurality of primitive queries, determining whether the one or more subscriptions in the subscriber data store collectively cover the first subscription comprises determining whether the one or more subscriptions in the subscriber data store collectively cover each of the plurality of primitive queries, the sending of the second subscription request is responsive to determining that the one or more subscriptions in the subscriber data store do not collectively cover at least one of the plurality of primitive queries, and the second subscription comprises at least the at least one of the plurality of primitive queries.

Optionally, the query is decomposed at least until each of the plurality of primitive queries is either covered by the one or more subscriptions in the subscriber data store, or is neither covered nor partially covered by the one or more subscriptions in the subscriber data store.

Optionally, the query is decomposed at least until none of the plurality of primitive queries are partially covered by the one or more subscriptions in the subscriber data store.

Optionally, the record associating the first subscriber process with the first subscription further associates a subscription priority with the first subscription.

Optionally, the subscription priority is based on the first subscription request.

Optionally, the subscription priority is based on an indication of a request priority in the first subscription request.

Optionally, the subscription priority is based on the first subscriber process.

Optionally, the subscription priority is based on the state data in the state data store.

Optionally, the intermediary process is a first intermediary process, the method further comprising, at a second intermediary process acting as an intermediary between the publisher system and a second plurality of subscriber processes, the second intermediary process having a second publisher data store storing one or more subscriptions for which the second intermediary process is a publisher, a second subscriber data store storing one or more subscriptions for which the second intermediary process is a subscriber, and a second state data store storing state data:
  receiving third event data from the publisher system;
  updating the state data in the second state data store based on the third event data;
  generating, with the first intermediary process and from the state data in the second state data store and the state data in the first state data store, fourth event data according to a subscription associated with a given one of the second subscriber processes in the second publisher data store; and
  sending the fourth event data to the given one of the second subscriber processes.

Optionally, the second event data is generated responsive to updating the state data in the state data store based on the first event data.

Optionally, the second event data is generated responsive to determining that a data communication channel between the intermediary process and the first subscriber process is ready.

Optionally, the second event data is generated responsive to determining that a timer has expired.

Optionally, the one or more subscriptions in the publisher data store are each associated with a subscription priority, and a time at which the second event data is generated and/or sent is based on the subscription priority of the subscription associated with the first subscriber process.

Optionally, the second event data is generated at the time based on the subscription priority of the subscription associated with the first subscriber process using a priority queue comprising the subscription associated with the first subscriber process and at least one of the other subscriptions in the publisher data store.

Optionally, generating the second event data comprises increasing a priority of the other subscriptions in the priority queue.

Optionally, the intermediary process forms part of an intermediary system and the intermediary system is a distributed system.

Optionally, the intermediary system further comprises the second intermediary process.

Optionally, the subscriptions are for content or data having one or more particular spatial characteristics.

Optionally, the subscriptions are for content or data in a particular region of a space.

Optionally, each subscription comprises at least one set of coordinates.

Optionally, each subscription comprises a query for selecting data from a database.

Optionally, the query is a Structured Query Language, SQL, query.

Optionally, generating the second event data comprises executing, on the state data store, the query associated with the first subscriber process in the publisher data store.

There is provided a computer program comprising instructions which, when executed by one or more computers, cause the one or more computers to perform any of the methods described herein.

There is provided a computer system configured to perform any of the methods described herein.

Optionally, the computer system comprises a computer-readable medium comprising the computer program and one or more processors configured to execute the computer program.

Optionally, the computer system comprises circuitry configured to perform any of the methods described herein.

BRIEF DESCRIPTION OF THE DRAWINGS

Examples of the present disclosure will now be explained with reference to the accompanying drawings in which.

Throughout the description and the drawings, like reference numerals refer to like parts.

DETAILED DESCRIPTION

In general terms, the present disclosure relates to a method and system for delivering a personalised (possibly partial) subset of a large, volatile data set to a subscriber process as it is updated. As the number of subscriber processes increases, the publisher system fans out across arbitrarily many intermediary processes to serve the burgeoning demands. This allows the individual subscriber processes to interface only with a local copy of their data, with which they are likely to be able to communicate more efficiently, and minimise the total bandwidth required to convey the data.

A publisher system and multiple intermediary processes are maintained, with at least one intermediary process for each region in which subscriber processes are present. Subscriber processes can subscribe to a particular view and be passively kept up-to-date with the data relevant to that view; the publisher system is responsible for deciding what data is relevant to the view, but the subscriber process can change the view to which it is subscribed at any time.

An intermediary system comprising the at least one intermediary process sits between the subscriber processes and the publisher system and holds a copy of at least the data relevant to the union of the views subscribed to by the subscriber processes in the intermediary process's region. The presence of an intermediary system allows subscriber processes to share data within their region; the intermediary process maintains a single view that is frequently refreshed and can be used as a cache to refresh views subscribed to by the subscriber processes. If a subscriber process in the same region as another subscriber process has a subscription that overlaps with a view of interest to the other subscriber process, the intermediary process can share that data between the subscriber processes without having to receive it again from the publisher system. Similarly, when a subscriber process subscribes to a new view, the intermediary process may be able to provide some or all of the relevant data for that view without having to request it from the publisher system. The intermediary system, as a distributed machine/system, can comprise many individual hosts or processes that are each specialized to a set of views with a high degree of overlap, further increasing the benefits of sharing.

Figure 1:
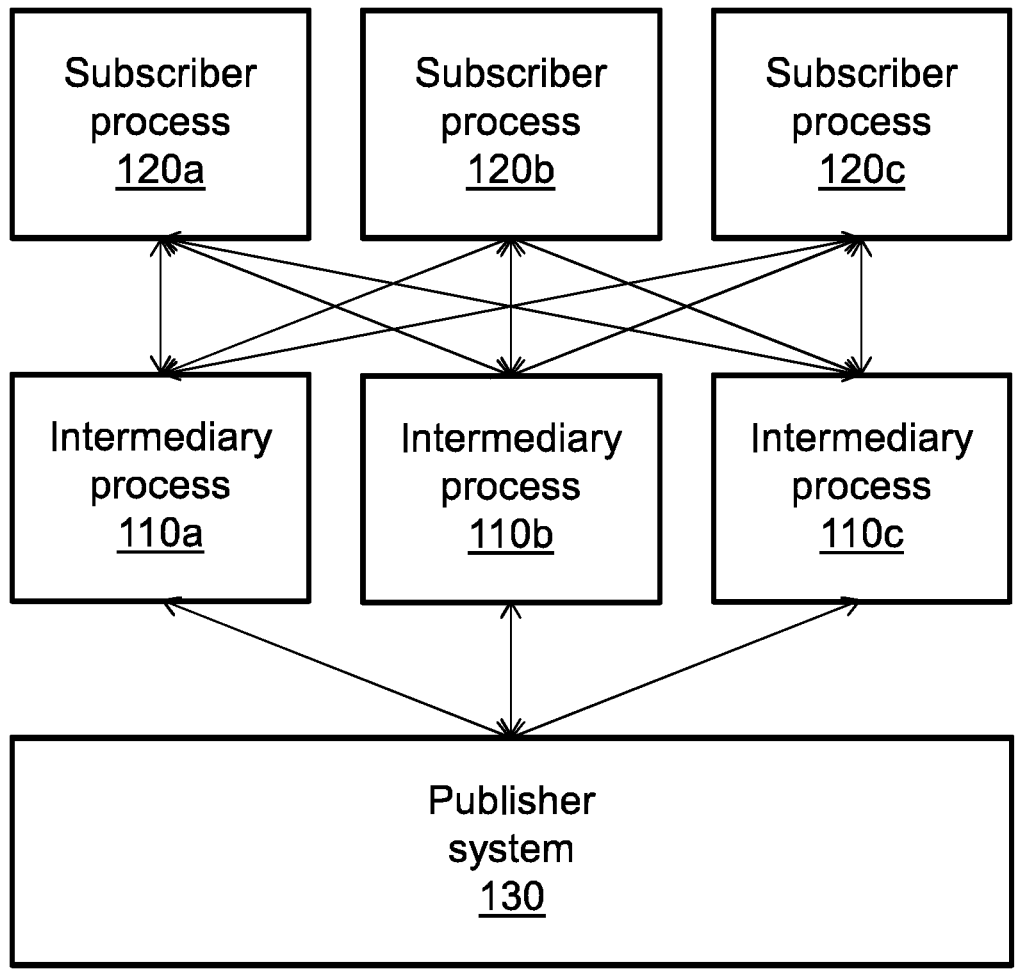
FIG. 1 shows a subscription-based data delivery system which can be used for implementing the methods described herein.

FIG. 1 shows a subscription-based data delivery system 100 which can be used for implementing the methods described herein.

The system 100 comprises an intermediary system (or 'intermediary', or 'intermediate', or 'replicator') comprising at least one intermediary process (or 'intermediate process', or 'replicator process') 110a, 110b, 110c. Each of the at least one intermediary processes acts as an intermediary between at least one subscriber process (or 'client', or 'subscriber', or 'subscriber client', or 'consumer', or 'consumer client', or 'client node', or 'subscriber node', or 'subscriber client node', or 'consumer node', or 'consumer client node') 120a, 120b, 120c and a publisher system (or 'publisher process', or 'publisher server', or 'publisher', or 'producer', or 'producer server', or 'producer process', or 'event producer', or 'event producer server', or 'event producer process', or 'content source', or 'content source process', or 'event source', or 'event source process') 130.

The subscriber process(es) 120, intermediary process(es) 110 and publisher system 130 exchange subscription requests and data as explained in more detail below and, in particular, in FIG. 3. The communication between these entities may occur via a communications network such as the Internet.

Figure 2:
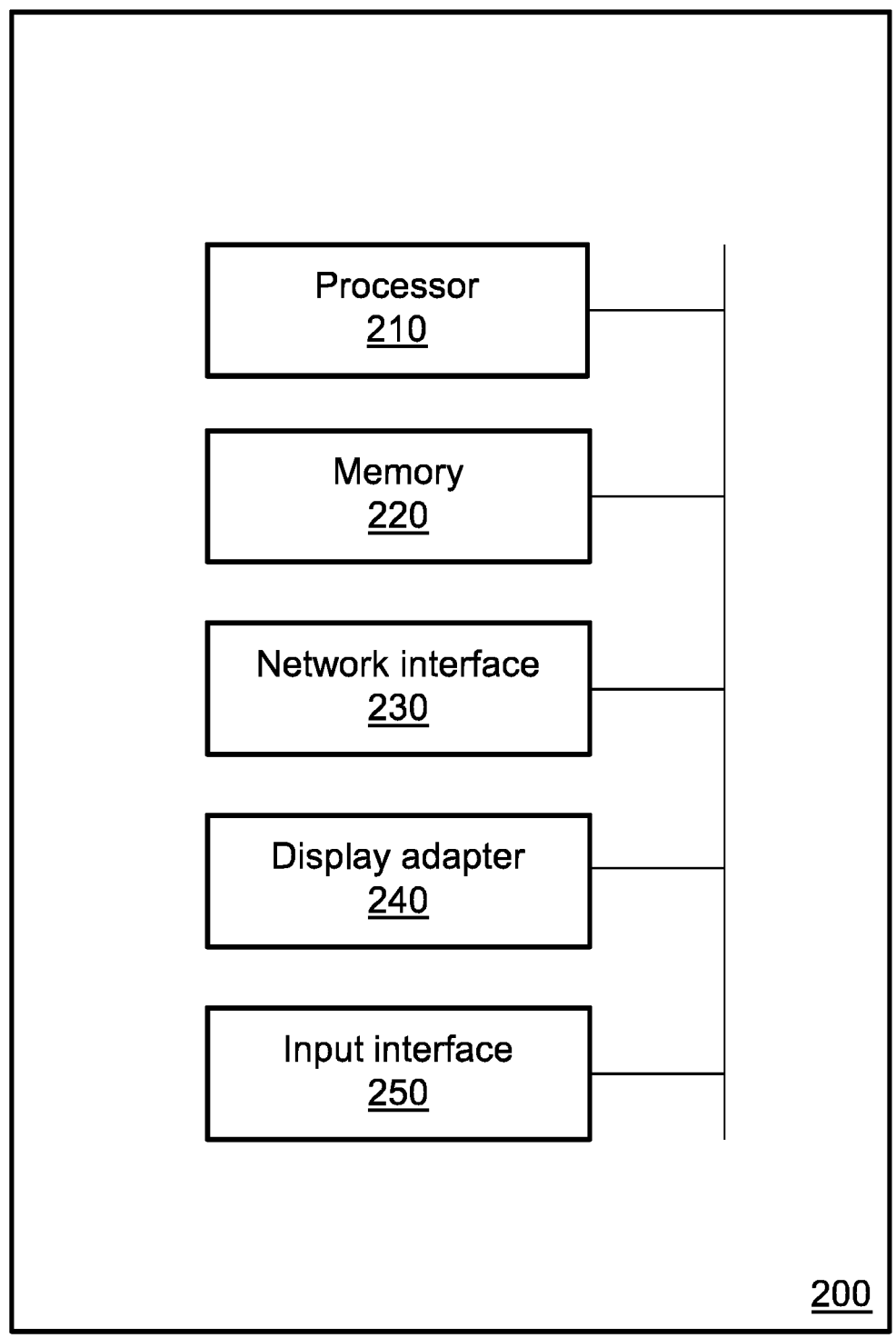
FIG. 2 shows an apparatus which can be used for implementing any of the methods described herein.

A block diagram of an exemplary apparatus 200 for implementing any of the methods described herein is shown in FIG. 2. The apparatus 200 comprises a processor 210 arranged to execute computer-readable instructions as may be provided to the apparatus 200 via one or more of a memory 220, a network interface 230, or an input interface 250.

The memory 220, for example a random-access memory (RAM), is arranged to be able to retrieve, store, and provide to the processor 210, instructions and data that have been stored in the memory 220. The network interface 230 is arranged to enable the processor 210 to communicate with a communications network, such as the Internet. The input interface 250 is arranged to receive user inputs provided via an input device (not shown) such as a mouse, a keyboard, or a touchscreen. The processor 210 may further be coupled to a display adapter 240, which is in turn coupled to a display device (not shown).

Figure 3:
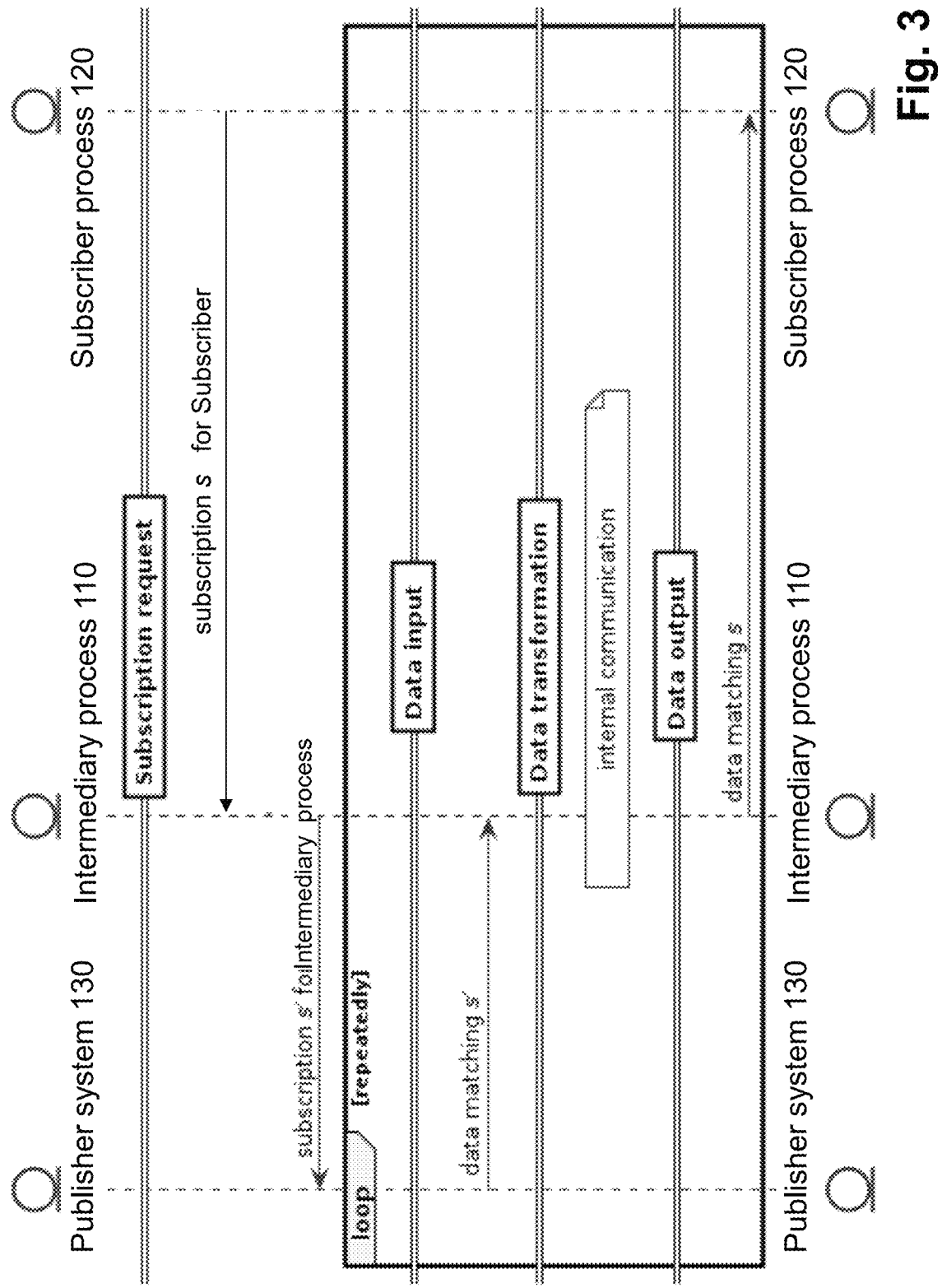
FIG. 3 shows a sequence diagram illustrating how the entities of FIG. 1 can communicate with each other.

FIG. 3 shows a sequence diagram illustrating how, in general terms, the entities of FIG. 1 can communicate with each other. A subscriber process 120 sends a subscription request comprising a subscription s to an intermediary process 110. The intermediary process 110 sends a subscription request comprising a subscription s' to a publisher system 130, the subscription s' comprising at least the subscription s.

Later, the publisher system 130 delivers data matching the subscription s' to the intermediary process 110. The intermediary process 110 transforms the data. The intermediary process 110 then sends the subscriber process 120 the data that matches subscription s. As additional data is received from the publisher system 130, these steps are repeated.

The method of subscription-based data delivery 400 of the present disclosure is now described with reference to FIGS. 4a and 4b. The method 400 is split into two parts: a first part 400a and a second part 400b. Each part may be, but need not be, executed independently.

The method is performed at an intermediary process 110a acting as an intermediary between a publisher system 130 and a plurality of subscriber processes 120 (e.g., the subscriber processes 120a, 120b, 120c of FIG. 1). The intermediary system may be a distributed system/machine.

The intermediary process 110a has a publisher data store storing one or more subscriptions for which the intermediary process 110a is a publisher, and a subscriber data store storing one or more subscriptions for which the intermediary process 110a is a subscriber. The intermediary process 110a also has a state data store storing state data.

The subscriptions may be of various types, depending on the data to be delivered. The subscriptions may, for example, be for content or data having one or more particular spatial characteristics. The subscriptions may be for content or data in a particular region of a space, which may be multidimensional (e.g., two- or three-dimensional).

The spatial characteristics or region may be at least partially defined by the subscriptions themselves. Each subscription may thus comprise at least one set of coordinates. For example, each subscription may comprise coordinates defining corners of a bounding box, allowing a subscriber process to request content or data that is within the bounding box. Each subscription may comprise a set of angles defining a circular or spherical sector, allowing a subscriber process to request content or data that is within the circular or spherical sector. Each subscription may comprise a position and a radius, allowing a subscriber process to request content or data that is within a given radius of the position.

The subscriptions may additionally or alternatively be for data in a database, e.g., a relational database. Each subscription may therefore comprise a query for selecting data from the database. The query may be a Structured Query Language, SQL, query.

It will be appreciated that the language of the subscription may depend on the structure of the data to which the subscriber process wishes to subscribe, and there is therefore considerable flexibility in the structure of the subscriptions that can be handled by the approaches described herein.

The subscription may not directly define the content or data to which the subscriber process wishes to subscribe; instead, the intermediary process 110 may use additional knowledge or pre-defined criteria to determine the data to which the subscriber process wishes to subscribe. For example, a subscriber process may request to subscribe to content within a given radius of its current position without providing its current position, since the intermediary process 110a can determine the subscriber process's current position from the state data store.

In step S410, the intermediary process 110 receives, from a first one 120a of the plurality of subscriber processes 120, a first subscription request comprising a first subscription for the first subscriber process 120a. The first subscription may be structured as explained above.

Alternatives to, or examples of implementations of, step S410 are provided in steps 510, 710, and 810 below.

In a data delivery system 100 comprising multiple intermediary processes 110, the intermediary process 110a may determine whether it is responsible for the first subscriber process 120a and/or whether it is responsible for the first subscription, as in step 818 below. Responsive to determining that it is not responsible for the first subscriber process 120a and/or the first subscription, the intermediary process 110a may forward the first subscription request or first subscription to one or more other intermediary processes 110b, 110c, or may discard the first subscription request.

In step S420, the intermediary process 110a stores, in the publisher data store, a record associating the first subscriber process 120a with the first subscription. In this way, the intermediary process 110a can keep track of the subscriptions for which it is a publisher, allowing later delivery of data that matches these subscriptions.

Alternatives to, or examples of implementations of, step S420 are provided in steps 520, 720, and 820 below.

In step S430, the intermediary process 110a determines whether the one or more subscriptions in the subscriber data store collectively cover the first subscription. For example, if the subscriptions are for content or data in a particular region of a space, the intermediary process 110a may determine whether the particular region corresponding to the first subscription is a subset of the particular regions corresponding to the one or more subscriptions in the subscriber data store. As another example, if the subscriptions are for particular data in a database, the intermediary process 110a may determine whether the particular data corresponding to the first subscription is fully covered by the particular data corresponding to the one or more subscriptions in the subscriber data store. In this way, the intermediary process 110a can determine whether it already has the subscriptions that would be required to service the first subscription.

Alternatives to, or examples of implementations of, step S430 are provided in steps 530, 730, and 830 below.

In step S440, responsive to determining that the one or more subscriptions in the subscriber data store do not collectively cover at least a portion of the first subscription, the intermediary process 110a sends, to the publisher system 130, a second subscription request comprising a second subscription for the intermediary process, the second subscription comprising at least the at least a portion of the first subscription. The intermediary process 110a also stores, in the subscriber data store, a record of the second subscription.

If, instead, the one or more subscriptions in the subscriber data store do collectively cover the first subscription, then step S440 is not required. Step S440 may therefore be performed conditional upon determining that the one or more subscriptions in the subscriber data store do not collectively cover at least a portion of the first subscription.

The second subscription request may override any previous subscription request sent to the publisher system 130. In this case, the second subscription may comprise the subscriptions stored in the subscriber data store; in other words, the second subscription may comprise the first subscription as well as any subscriptions already stored in the subscriber data store.

The second subscription may further comprise an additional subscription for content or data neighbouring the first subscription. For example, if the subscriptions are for content or data in a particular region of a space, the intermediary process 110a may determine a bounding box for the subscriptions stored in the subscriber data store and the second subscription may comprise the bounding box. In other examples, the intermediary process 110a may determine the additional subscription from the first subscription using a proximity measure.

Alternatives to, or examples of implementations of, step S440 are provided in steps 540, 740, and 840 below.

In step S460, the intermediary process 110a receives first event data from the publisher system 130. The event data may describe changes that have been made to the content data to which the intermediary process 110a has subscribed, e.g., changes that have been made since event data was last sent to the intermediary process 110a. For example, the event data may be a notification that a row has been added to a database, or a list of new objects in a particular region of space, or an updated list of positions of objects in a particular region of space.

Alternatives to, or examples of implementations of, step S460 are provided in steps 660, 760, and 860 below.

In step S470, the intermediary process 110a updates the state data in the state data store based on the first event data. The intermediary process 110a may, for example, add records to the state data store that comprise the received first event data. The intermediary process 110a may alternatively or additionally replace at least a portion of the state data with at least a portion of the first event data.

Alternatives to, or examples of implementations of, step S470 are provided in steps 670, 770, and 870 below.

In step S490, the intermediary process 110a generates, from the state data in the state data store, second event data according to the subscription associated with the first subscriber process 120a in the publisher data store.

Generating the second event data from the state data may comprise selecting a portion of the state data according to the subscription associated with the first subscriber process 120a in the publisher data store.

Generating the second event data may further comprise transforming the state data. For example, the state data may be compressed, the state data may be reordered, and floating point numbers may be transformed from double-precision to single-precision format. If the state data is video or image data, the state data may be downscaled or upscaled.

Generating the second event data may comprise adapting the second event data to the first subscriber process 120a. For example, the intermediary process 110a may transform coordinates in the second event data so that the coordinates are relative to a position of a player corresponding to the first subscriber process 120a within a virtual space, and the position of the player may be obtained from the state data.

The first subscription request may comprise an indication of computing capabilities of the first subscriber process 120a. In this case, generating the second event data may comprise adapting the second event data to the computing capabilities of the first subscriber process 120a. The indication may be a user agent, or a list of computing capabilities (e.g., an indication that the first subscriber process 120a supports floating-point arithmetic).

Figure 8A:
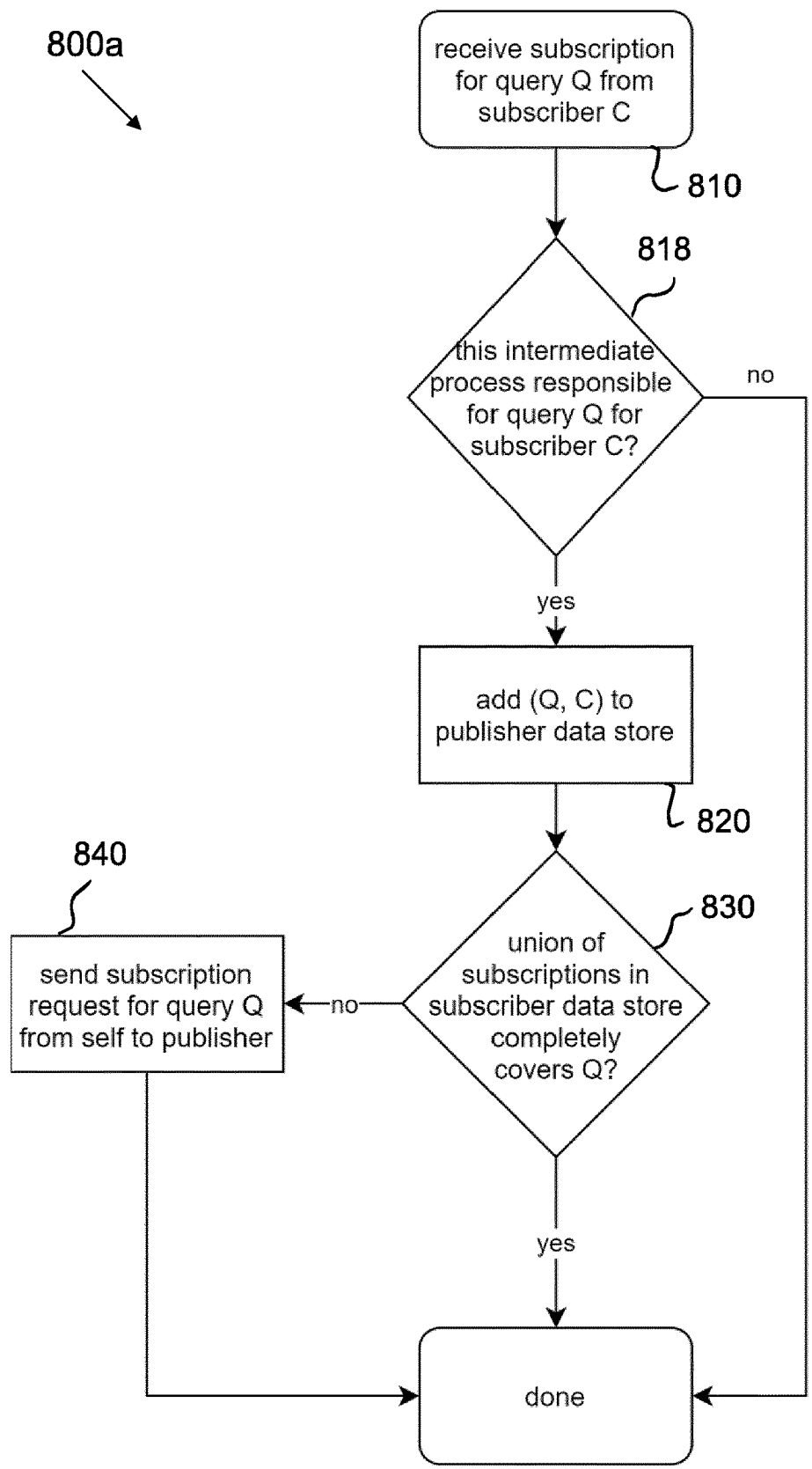
FIGS. 8a, 8b and 8c show first, second and third parts of a flowchart illustrating how the methods described herein can be applied in an example scenario in which the subscriptions are for data in a database.
Figure 8B:
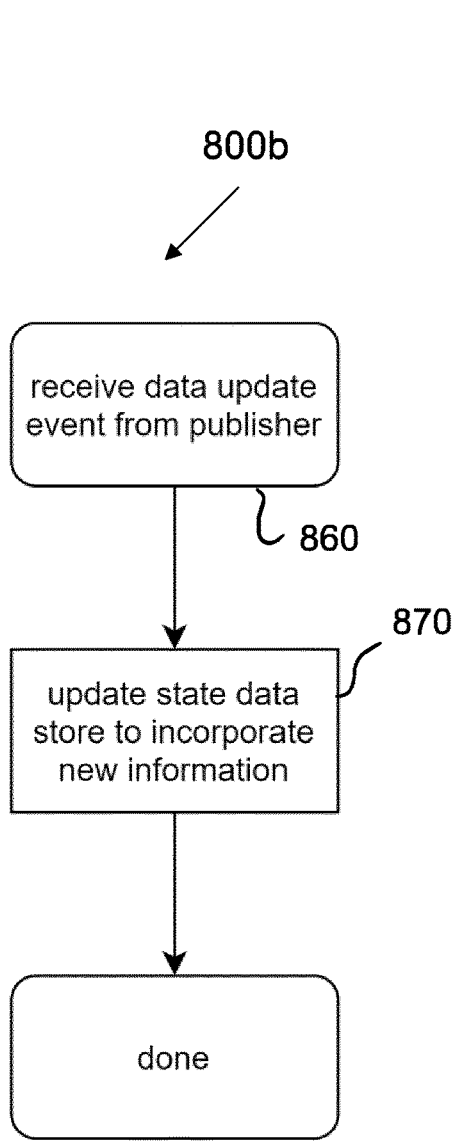
Figure 8C:
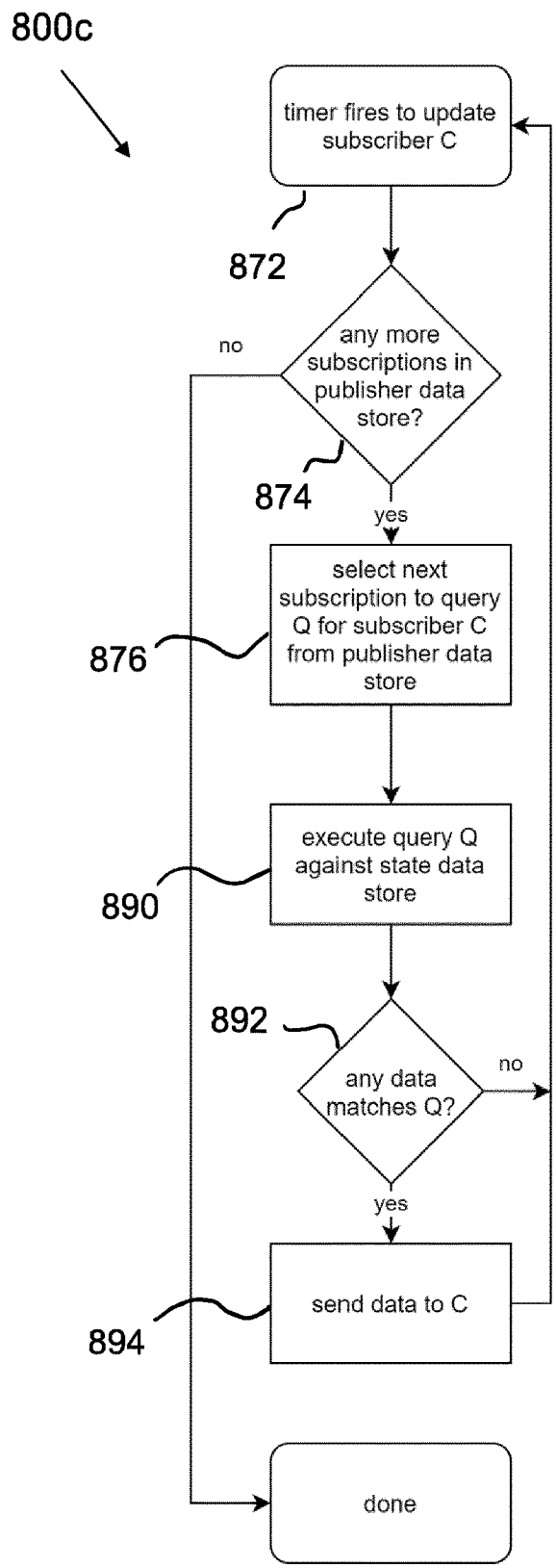

If the subscriptions comprise a query for selecting data from a database, generating the second event data may comprise executing, on the state data store, the query associated with the first subscriber process 120a in the publisher data store, as illustrated in more detail in FIG. 8c. In this way, a query can be used to define a subscription as well as generate event data from state data to service that subscription.

Alternatives to, or examples of implementations of, step S490 are provided in steps 690, 790, and 890 below.

In step S494, the intermediary process 110a sends the second event data to the first subscriber process 120a. In this way, the first subscriber process 120a receives data corresponding to the first subscription.

Alternatives to, or examples of implementations of, step S494 are provided in steps 694, 794, and 894 below.

The generating and/or sending of the second event data in steps S490 and S494 is initiated by the intermediary process 110a, rather than the first subscriber process 120a. The intermediary process 110a therefore provides a push service to the first subscriber process 120a.

The generating and/or sending of the second event data in steps S490 and S494 may be repeated, and the repeating may be at a rate that is specific to the first subscriber process 120a.

The second event data may repeatedly be generated in step S490 for a single subscriber process (e.g., the first subscriber process 120a) or for multiple subscriber processes, and then stored, ready to be sent at a later time in step S494. In other words, each execution of step S494 may not immediately follow an execution of step S490. In this way, the intermediary process 110a may take advantage of spare processing resources at a time when communication resources are unavailable or in short supply.

Similarly, method 400, or any portion thereof, may be repeated for a second subscriber process 120b. In particular, in step S410, the intermediary process 110a receives, from the second subscriber process 120b, a third subscription request comprising a third subscription for the second subscriber process 120b. In step S420, the intermediary process 110a stores, in the publisher data store, a record associating the second subscriber process 120b with the third subscription. In step S430, the intermediary process 110a determines whether the one or more subscriptions in the subscriber data store collectively cover the third subscription. In this case, the one or more subscriptions in the subscriber data store may collectively cover the third subscription. Step S440 need not, therefore, be executed. In step S490, subsequent to updating the state data in step S470 during a previous execution of the method 400, the intermediary process 110a generates, from the state data in the state data store, fourth event data according to the subscription associated with the second subscriber process 120b in the publisher data store. In step S494, the intermediary process 110a sends the fourth event data to the second subscriber process 120b. In this way, the intermediary process 110a is able to service the third subscription without requesting any additional subscriptions from the publisher system 130, thereby reducing load on the publisher system 130. Similarly, the intermediary process 110a can service another subscription from the first subscriber process 120a without requesting any additional subscriptions from the publisher system 130 if that other subscription is covered by the subscriptions in the subscriber data store, thereby further reducing load on the publisher system 130.

Steps S460 and S470 may also be repeated at any point. For example, subsequent to updating the state data in step S470, the intermediary process 110a may receive, in step S460, third event data from the publisher system 130. In step S470, the intermediary process 110a may update the state data in the state data store based on the third event data. In step S490, the intermediary process 110a may generate the second event data from the state data which takes into account both the first event data and the third event data.

As can be seen from the above, the frequency of updates from the publisher system 130 to the intermediary process 110a and from the intermediary process 110a to the subscriber processes 120 may be different. For example, steps S460 to S470 can be repeated a plurality of times before step S490 is performed.

If the first subscription comprises a query for selecting data from a database, the intermediary process 110a may decompose the query into a plurality of primitive queries. Determining whether the one or more subscriptions in the subscriber data store collectively cover the first subscription in step S430 may then comprise determining whether the one or more subscriptions in the subscriber data store collectively cover each of the plurality of primitive queries. The sending of the second subscription request in step S440 may then be responsive to determining that the one or more subscriptions in the subscriber data store do not collectively cover at least one of the plurality of primitive queries, and the second subscription may comprise at least the at least one of the plurality of primitive queries.

The query may be decomposed at least until each of the plurality of primitive queries is either covered by the one or more subscriptions in the subscriber data store, or is neither covered nor partially covered by the one or more subscriptions in the subscriber data store. In other words, the query may be decomposed at least until none of the plurality of primitive queries are partially covered by the one or more subscriptions in the subscriber data store. In yet other words, the query may be decomposed into wholly disjoint and wholly covered queries. In this way, the intermediary process 110a requests from the publisher system 130 only the subscriptions that are actually required.

Steps S490 and/or S494 may be triggered based on various events. For example, the second event data may be generated and/or sent responsive to updating the state data in the state data store based on the first event data in step S470. Additionally or alternatively, the second event data may be generated and/or sent responsive to determining that a data communication channel between the intermediary process 110a and the first subscriber process 120a is ready. Additionally or alternatively, the second event data may be generated and/or sent responsive to determining that a timer has expired.

The record associating the first subscriber process 120a with the first subscription may further associate a subscription priority with the first subscription. The subscription priority may be (determined) based on the first subscription request, on an indication of a request priority in the first subscription request, on the first subscriber process 120a, and/or on the state data in the state data store. The one or more subscriptions in the publisher data store may thus each be associated with a subscription priority. A time at which the second event data is then generated in step S490 may then be based on the subscription priority of the subscription associated with the first subscriber process 120a, as illustrated in FIG. 7c.

Method 400, or any portion thereof, may also be performed at a second intermediary process 110b. The second intermediary process 110b acts as an intermediary between the publisher system 130 and a second plurality of subscriber processes 120. The second plurality of subscriber processes may partially or fully overlap with the plurality of subscriber processes served by the first intermediary process 110a. The second intermediary process 110b has a second publisher data store storing one or more subscriptions for which the second intermediary process 110b is a publisher, a second subscriber data store storing one or more subscriptions for which the second intermediary process 110b is a subscriber, and a second state data store storing state data. In steps S410 to S440, the second intermediary process 110b handles a subscription request from a given one of the second plurality of subscriber processes as described above. In step S460, the second intermediary process 110b receives third event data from the publisher system. In step S470, the second intermediary process 110b updates the state data in the second state data store based on the third event data. In step S490, the second intermediary process 110b may generate, from the state data in the second state data store, fourth event data according to a subscription associated with the given one of the second subscriber processes in the second publisher data store. However, in step S490, the second intermediary process 110b may alternatively generate the fourth event data with the first intermediary process 110a, and may generate the fourth event data from the state data in the first state data store (of the first intermediary process 110a) as well as the state data in the second state data store. In step S494, the second intermediary process sends the fourth event data to the given one of the second subscriber processes. In this way, the first and second intermediary processes 110a and 110b may work together to deliver data to the given one of the second subscriber processes, thereby allowing the first and second intermediary processes 110a and 110b to operate on a state data set that is larger than either of the first and second intermediary processes 110a and 110b can individually support.

An intermediary process 110a may, at any point, determine that it is overloaded and instantiate a new intermediary process 110c. In this case, the intermediary process 110a may send, to the new intermediary process 110c, a first set of subscriptions from its publisher data store and delete those subscriptions from its publisher data store, and/or send, to the new intermediary process 110c, a second set of subscriptions from its subscriber data store and delete those subscriptions from its subscriber data store.

Similarly, the new intermediary process 110c (or any other intermediary process 110) may determine that it is underloaded. In this case, the intermediary process 110c may send, to the intermediary process 110a, a first set of subscriptions from its publisher data store and delete those subscriptions from its publisher data store, and/or send, to the intermediary process 110a, a second set of subscriptions from its subscriber data store and delete those subscriptions from its subscriber data store. In this way, the number of intermediary processes 110 can easily be scaled up and down based on load.

The subscriber processes 120 may be able to communicate with any of the intermediary processes 110. However, if an intermediary process 110a receives a subscription request comprising a subscription for which it is not responsible, and/or from a subscriber process 120 for which it is not responsible, it may forward the subscription request to another intermediary process 110b, 110c or discard the subscription request, as explained above and illustrated in FIG. 9.

Each intermediary process 110 may be responsible for subscriber processes 120 in a given geographic region, and may be located in that region. In this way, a subscriber process 120 can communicate with an intermediary process 110 that is near them, thereby reducing latency.

Figure 4A:
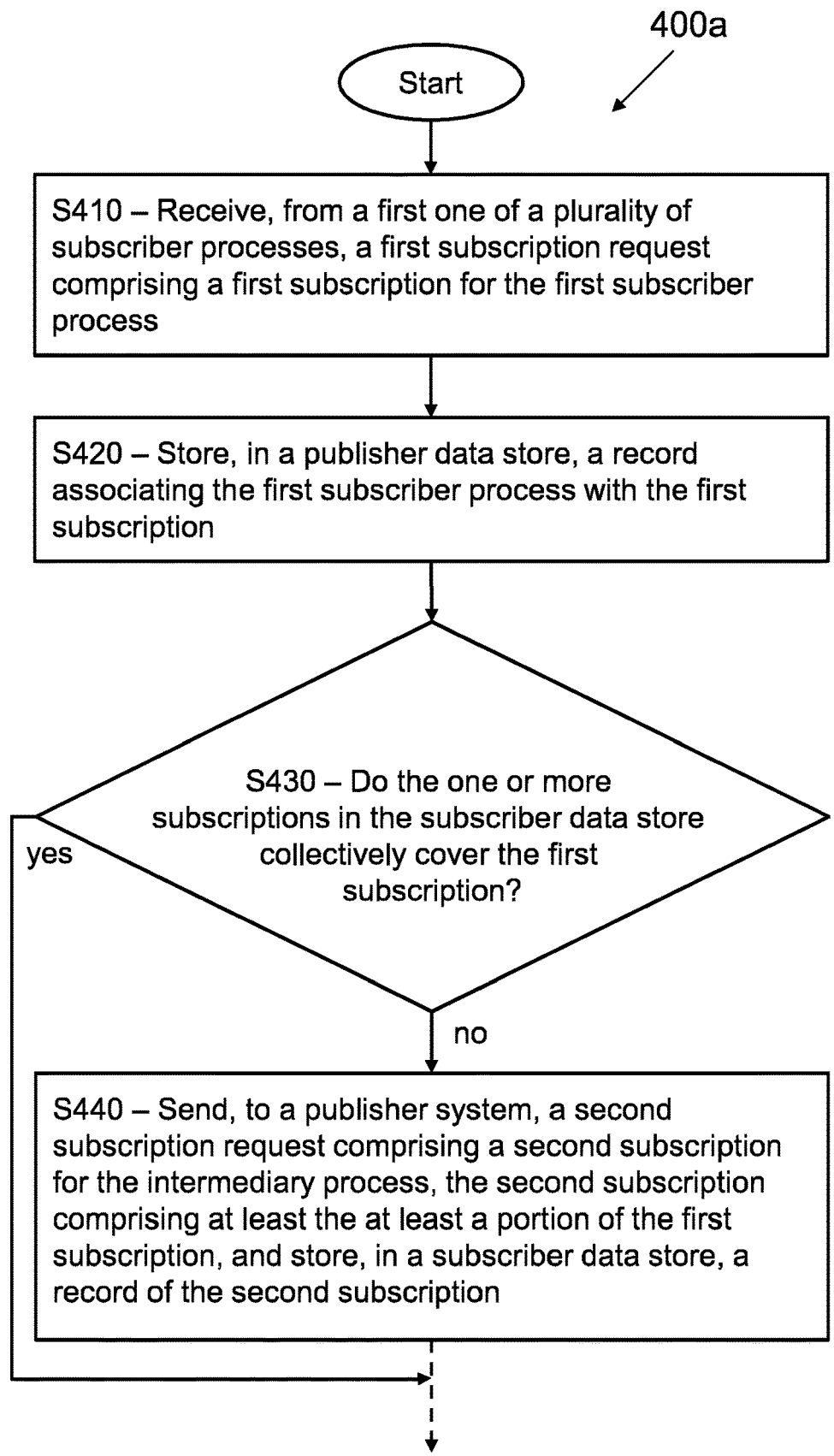
FIGS. 4a and 4b show a first and a second part of a flowchart illustrating steps of a method of subscription-based data delivery.
Figure 4B:
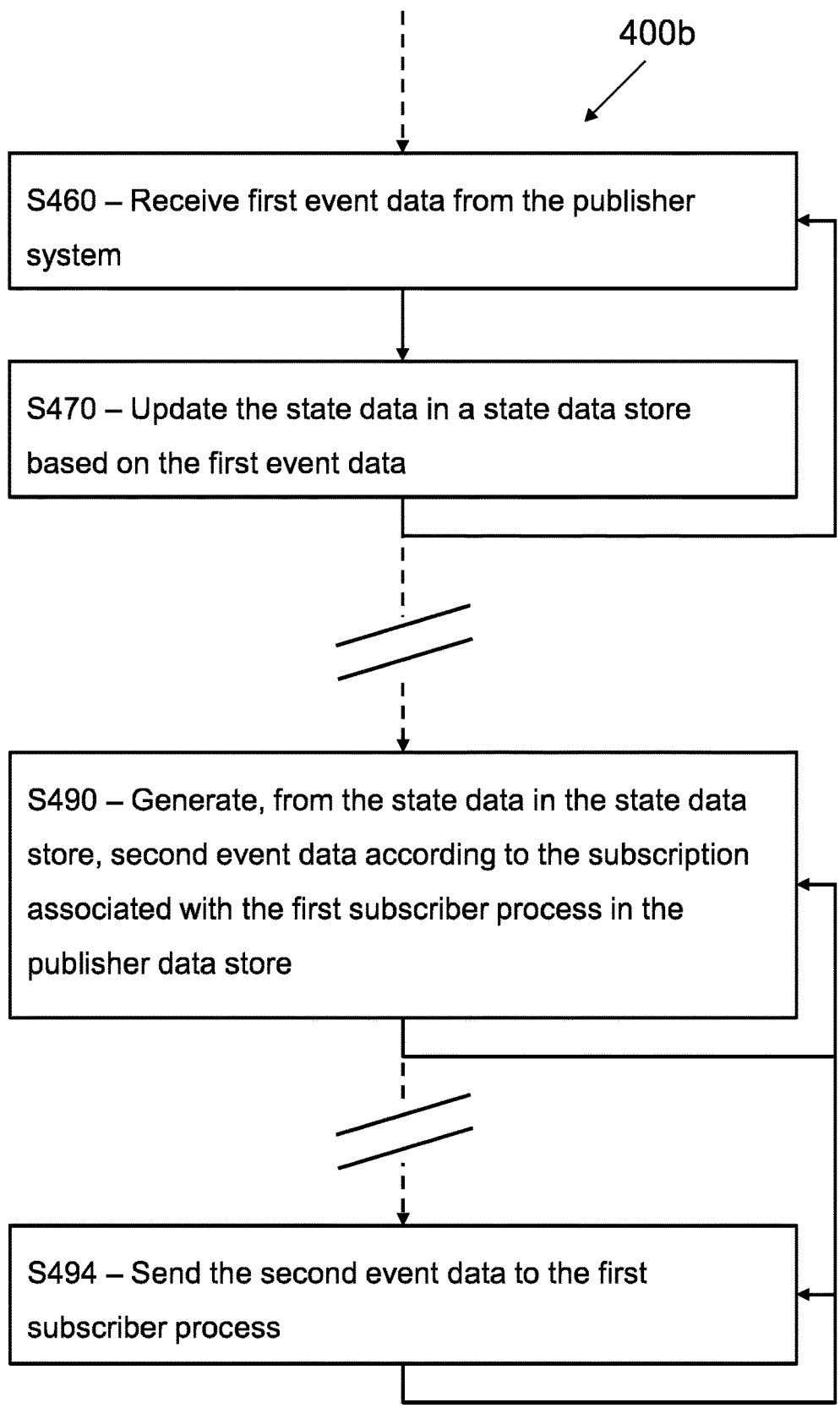

There now follows an explanation of the theory that motivates the approach set out in FIGS. 4a and 4b.

The headings that follow are provided purely for readability and should not be construed as limiting.

Introduction

Publish/subscribe is a model of decoupled communication in which one process, the publisher, makes available a set of data and another process, the subscriber, requests a subscription to some type of data, thereafter receiving a sender-initiated stream of messages that match that request. The present disclosure relates to a distributed middleware layer, known as an intermediary system, for a publish/subscribe model that performs intelligent caching and redistribution of the subscription data.

Definitions

Publisher system:
    an upstream publisher of data; and/or
    a distributed machine that holds the authoritative copy of the dataset.
Subscriber process:
    a downstream subscriber to the data of the publisher system; and/or
    a machine that is interested in knowing the data relevant to a view.
Distributed machine: a logical unit that performs a computation, formed of potentially many smaller computational components connected by an unreliable network.
Region: a geographically bounded set of machines.
View: a query that defines a volatile subset of the data held on the publisher system, which data is said to be relevant to the view.

Intermediary system: a distributed machine within a region that is used as a direct point of contact for the subscriber process to learn about the relevant data.

Intermediary

An intermediary system is a distributed system/machine that bridges two publish/subscribe networks: it acts as a subscriber to the publisher system, and publishes data to which subscriber processes can subscribe. The intermediary system comprises one or more processes, each of which is responsible for some subset of the data published by the publisher system, and each of which keeps some (potentially incomplete) representation of the state held on the publisher system. When the intermediary system receives a subscription request from a subscriber process, the request is received by one or more intermediary processes that together have responsibility covering the entirety of the set of data requested. If necessary, the intermediary processes so requested may perform a subscription with the publisher system to ensure they will be notified of any new events pertaining to the new subscription. When an event is received by an intermediary process from the publisher system, the intermediary process will use the event to update its understanding of the state. Henceforth, the subscriber process's subscription will be fulfilled by the intermediary processes by using their internal state, without direct recourse to the publisher system.

Figure 9:
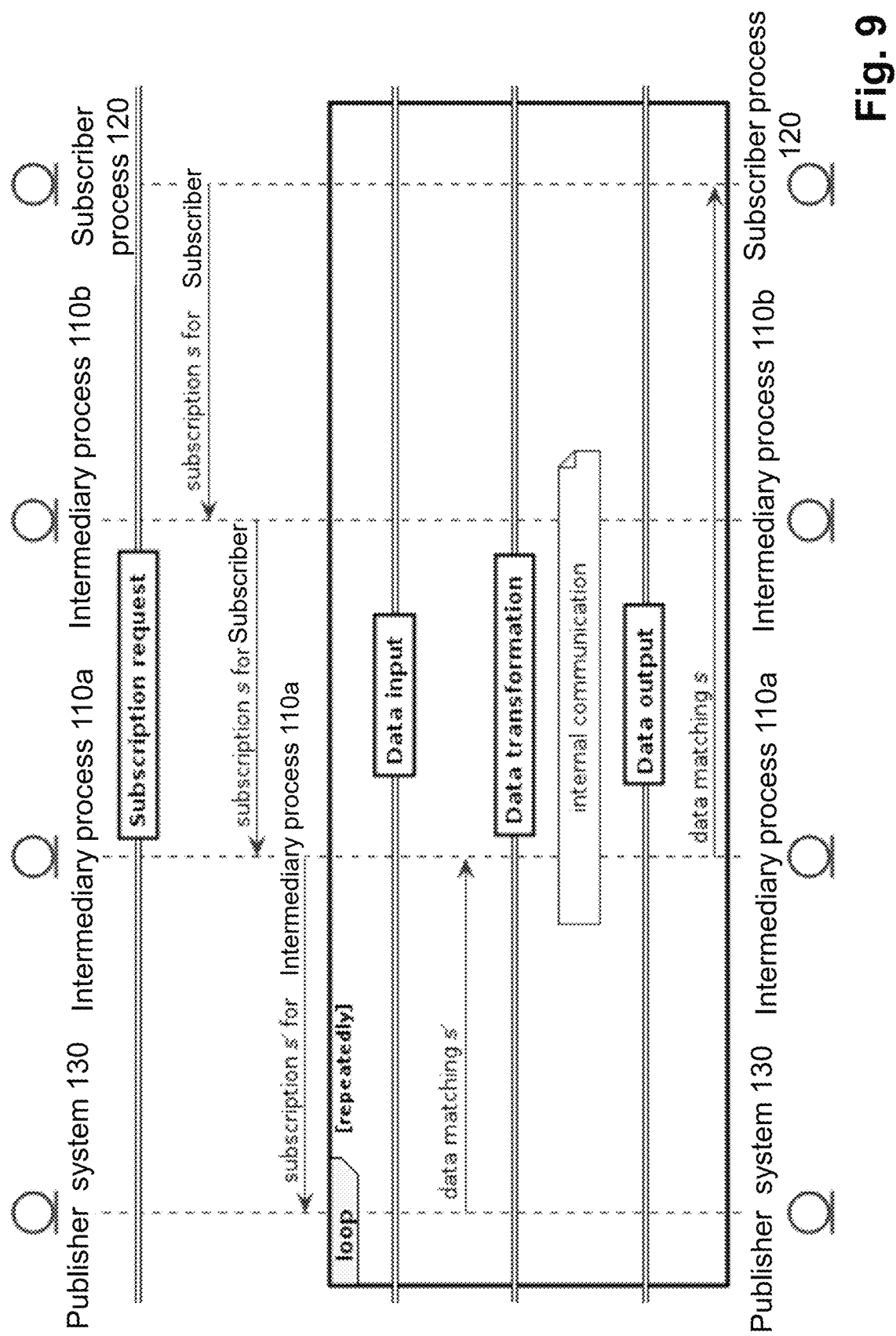
FIG. 9 shows a sequence diagram illustrating how the entities of FIG. 1 can communicate with each other in an example scenario.

In FIG. 9, a subscriber process 120 requests a particular subscription, s, of the intermediary system. The request lands at a single intermediary process; internal communication is done between intermediary processes 110a and 110b to propagate the subscription to the intermediary process that has responsibility for the relevant data. In order to fulfil the request, the intermediary process knows that it must have knowledge of a subset of the data for which it currently has no information, so requests a corresponding (but perhaps not identical) subscription s' of the publisher system. The publisher system 130 begins sending data to the intermediary process matching s'. As the intermediary system receives the data, it performs a distributed transformation, resulting in data that matches s. Once the transformation is done, the intermediary system begins streaming data back to the subscriber process that matches s.

Dynamicity

There are two sources of load:
  the data coming from the publisher system (some of which must be stored);
  the number of subscriber processes connecting (for each of which some state must be maintained).

As the intermediary system comprises multiple processes, all of which communicate with the publisher system by using a publish/subscribe mechanism, it is easy to dynamically scale the intermediary system set up or down to handle increased load. If the amount of data to be stored exceeds the capacity of the intermediary system, additional intermediary processes may be created with subscriptions that take over part of the overloaded process's responsibilities. If the number of connected subscriber processes becomes unmanageable, additional intermediary processes may be created that duplicate some of the responsibilities of the existing processes. These new processes can then be load-balanced over to handle those responsibilities.

Related Concepts

The intermediary system shares some functionality with a proxy, a cache or a content delivery network (CDN).

However, a proxy simply forwards requests and responses between the publisher and a client directly. The intermediary system is differentiated by understanding the messages it receives, and thus keeping state and being capable of intelligently creating messages of its own, rather than merely forwarding messages from a publisher. The intermediary system may also perform arbitrary transformations on the data: unlike in a proxy, there is no guarantee that the messages it passes through are similar to the messages that the client would receive were it to communicate with the publisher directly.

A cache is an intermediate store between a publisher and client. Like a cache, the intermediary system has updates pushed to it by the publisher; however, where the client is responsible for pulling data from a cache, the intermediary system actively pushes data to the client, taking responsibility for deciding what data to send and when. While the data in a cache is relatively static and tends to be updated infrequently, the data in an intermediary system is explicitly volatile: it expects to be updated frequently, maybe only partially, and the intermediary system behaviour is optimized to control the latency between publisher updates and their visibility to the client. Additionally, as in the proxy case, caches guarantee a faithful representation of the original data from the publisher, whereas intermediaries may arbitrarily transform the data passing through.

A traditional CDN requires the data to be mostly static in order to copy that data to multiple machines that can handle the increased number of requests. Live streaming services require that the clients define in advance the data they wish to receive, and are optimized to minimize jitter rather than latency, sometimes even introducing whole minutes of artificial latency for domain reasons like closed captioning or censorship.

Effects of the Disclosure

An effect of the present disclosure is to provide an approach for delivering very large volatile content to a large number of concurrent users observing and performing actions that modify the content where the veracity of shared state is important, e.g., in massively-multiplayer gaming, virtual reality clouds, entertainment platforms with dynamic stories or viewer-driven stories, video streaming, or rich online applications that are content heavy.

Geographic proximity: The publisher system is typically globally unique, and is likely to be networked to optimize internal communication rather than to be close to subscriber processes. An intermediary system, on the other hand, is designed to be placed in an edge data centre closer to the subscriber process.

Relevancy: The intermediary system is responsible for managing the quality of service seen by the subscriber process. It knows the properties of the network link between itself and the subscriber process, as well as the dataset being conveyed, and can adjust the rate of updates to prioritise messages that must be known immediately over messages that can be safely delayed. By keeping internal state, it becomes possible to decouple the event stream to the subscriber process from the event stream from the publisher system, meaning the intermediary system can send messages at a rate dictated by its understanding of the subscriber process's needs rather than by the rate of updates on the publisher system.

Data sharing: As more subscriber processes connect, the chance of overlap between their subscriptions increases. The intermediary system receives a single copy of the data that can be used to fulfil subscriptions to all subscriber processes with a matching subscription, decreasing the bandwidth required for exfiltration of data from the publisher system.

Transduction: The intermediary system effectively stores a history, meaning that it can perform transduction on the stream—transforming m input messages into n output messages. It is reasonable to assume that any user code running on an intermediary process for the purpose of transduction has the means to communicate with transduction code running on other intermediary processes—for example, by using the same publish/subscribe mechanism that is exposed externally.

Applications: In the gaming sphere, the intermediary system performs the function of 'net relevancy', deciding what messages must be sent and at what rates.

There now follows a more detailed description of the approach set out in FIGS. 4a and 4b, and shows how this approach can be applied to various example scenarios. It will be understood that the steps that follow may be added to, or replace, those described above.

Registering a Subscription

Figure 5:
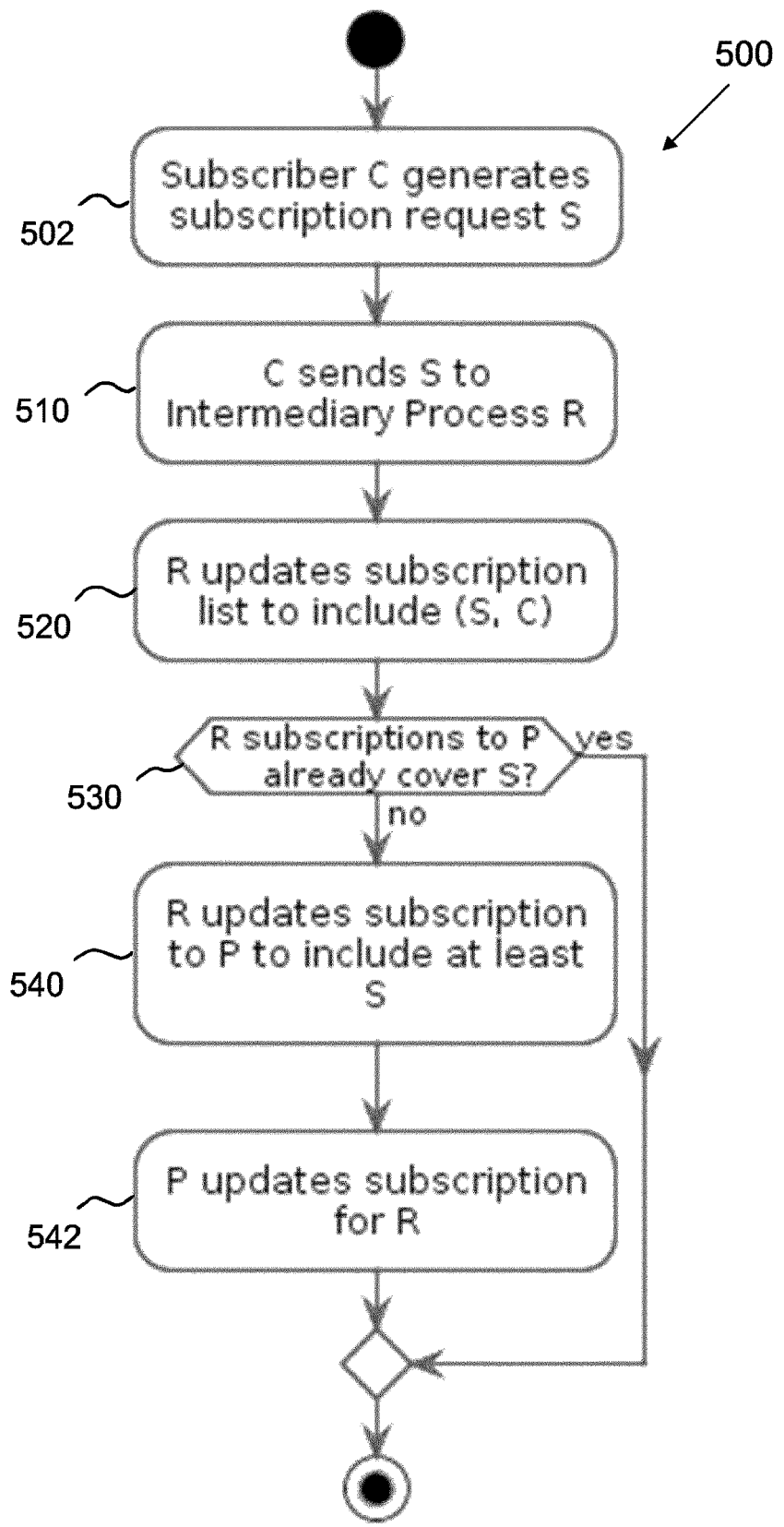
FIG. 5 shows a flowchart illustrating how the methods described herein can be applied in an example scenario.

The subscriber process can register a subscription with the intermediary process to receive updates for relevant data using the method 500 of FIG. 5. Suppose that the subscriber process has already discovered the location of the intermediary process, through some service discovery mechanism. In step 502, the subscriber process constructs a subscription request S, which details the scope of data that the subscriber process wishes to receive.

The subscriber process proceeds, in step 510, by sending the subscription request S to the intermediary process R (as in step S410). The intermediary process updates its subscription list to include (S,C) in step 520 (as in step S420). In step 530 (as in step S430), the intermediary process determines whether its subscription to the publisher system P already covers S. The intermediary process may already have a subscription that allows it to fulfil the subscription request of this new subscriber process, in which case the subscription is complete.

However, if the intermediary process does not hold enough information to fulfil the subscription request then it itself forwards the subscription onto the publisher system P in step 540 (as in step S440), so that it can later receive the data required to fulfil the subscription request. The publisher system P updates the subscription for R in step 542. The subscription is then complete.

Updating the Data Set

Figure 6:
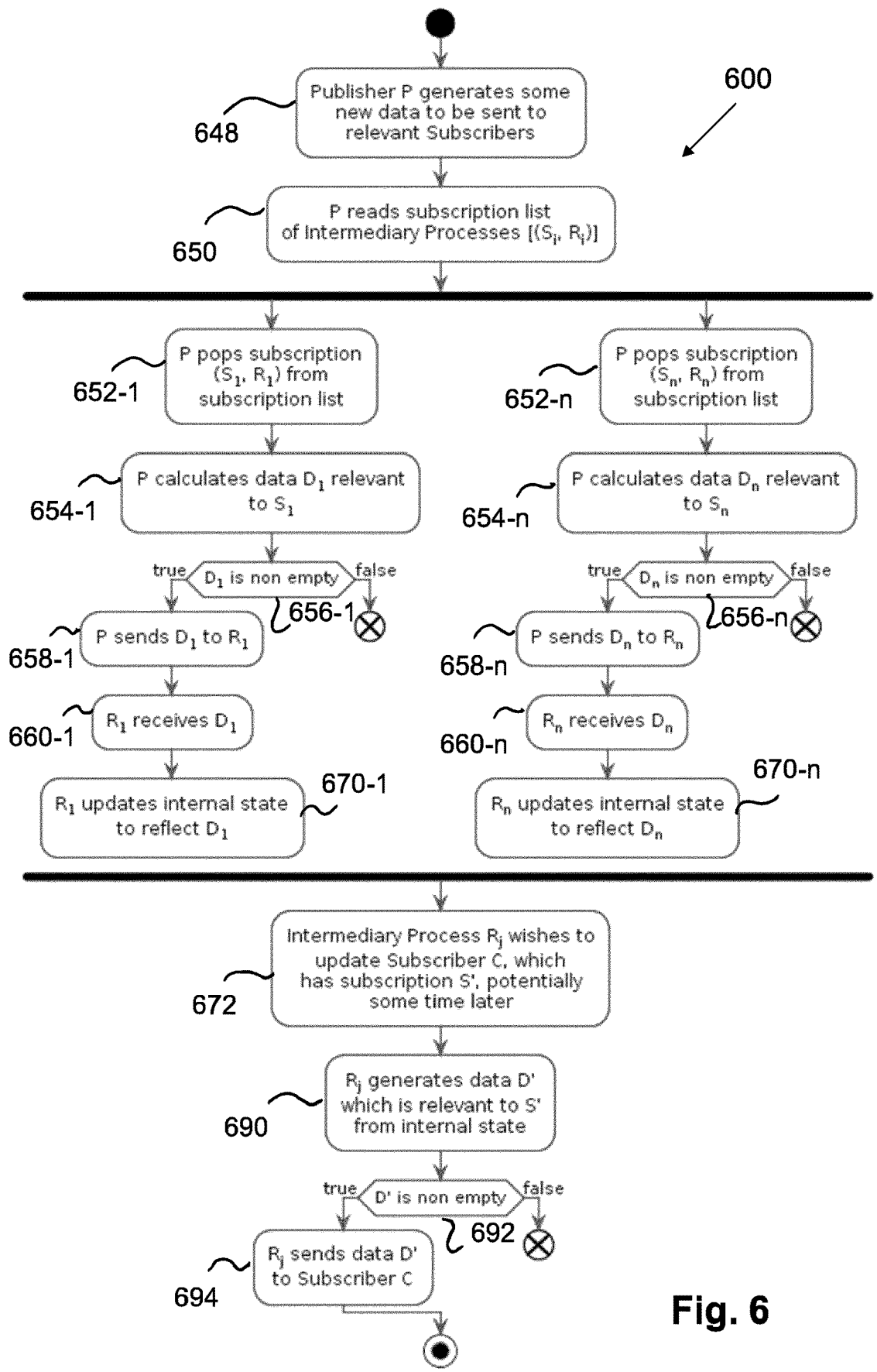
FIG. 6 shows a flowchart illustrating how the methods described herein can be applied in an example scenario.

When the publisher system has updated the data set, the subscriber processes will wish to know about this update. To do this efficiently is a core goal of the intermediary system. In order to update the subscriber processes, the method 600 of FIG. 6 is used. It is assumed here that a single publisher system P has multiple intermediary processes $R_1$ through $R_n$ that are subscribed to the publisher system using subscription requests $S_1$ through $S_n$ respectively. Suppose further that one of the intermediary processes $R_j$ has a subscriber process that has subscribed to $R_j$ with subscription request S', and that some of the updated data is relevant to S'.

When the data is updated in step 648, the publisher system P refers, in step 650, to its list of subscriptions $[(S_i, R_i)]$. At this point, it may be unclear which of these subscriptions the updated data is relevant for.

For each of these subscription, intermediary process pairs $(S_i, R_i)$, the publisher system P calculates, in step 654, the data set $D_i$ that is relevant to $S_i$. This may happen concurrently for each member of the subscription list. The publisher system P then determines, in step 656, if $D_i$ is empty. If $D_i$ is empty, then the publisher system may stop considering the subscription $S_i$ for this particular update.

If $D_i$ is non-empty, the publisher system P proceeds to send, in step 658, $D_i$ to the intermediary process $R_i$, which receives it in step 660 (as in step S460). $R_i$ then updates its own internal representation of the state, in step 670 (as in step S470), to reflect the update in $D_i$. The exact nature of this update is user-defined, but may for example include updating a spatial acceleration structure such as an octree, or transforming the data into a format more suitable for sending to subscriber processes.

When the intermediary process $R_j$ next determines that it should send an update to a subscriber process, in step 672, it proceeds as follows. Note that this may not be in direct response to the update sent from the publisher system P, but instead at some later time. For example, the update may be sent to a subscriber process when a set amount of time has elapsed since the last update sent to that subscriber process, or when the connection from the subscriber process to the intermediary process is now ready to be written to, having completed previous data sends.

Given that $R_j$ has determined that the subscriber process C should receive an update, and that the subscriber process C previously subscribed with subscription request S', the intermediary process $R_j$ calculates, in step 690 (as in step S490), the data set D' which is the data relevant to S'. The intermediary process $R_j$ calculates this data set from its own internal representation, and need not query the publisher system P. The intermediary process $R_j$ then determines whether the relevant data set D' is non-empty in step 692. If the relevant data set D' is empty, then the intermediary process R may choose to not send any update to the subscriber process. In this case, the intermediary process $R_j$ may send a specific no-update message indicating that D' is empty.

Given that D' is non-empty, the intermediary process $R_j$ sends D' to C in step 694 (as in step S494), which allows C to become aware of the original data update by P.

Scheduling Updates

To handle the scheduling of updates to subscribers, a priority queue-like data structure may be used. The priorities may increase over time to avoid starvation scenarios in which lower-priority subscriptions may not be serviced. Methods 700a, 700b, 700c of FIGS. 7a, 7b and 7c, respectively, provide an implementation of such a priority-based data delivery method.

In step 710 (as in step S410), an intermediary process receives a subscription request from a subscriber. In step 716, the intermediary process generates an initial subscription priority from the subscription based on the state, subscriber and subscription. In step 720 (as in step S420), the intermediary process inserts the subscription into its publisher data store. In this case, the subscription is inserted into the subscriber's subscription queue with the initial subscription priority determined in step 720. In step 730 (as in step S430), the intermediary process determines whether the union of the subscriptions in its subscriber data store completely covers the subscription. If the union of the subscriptions in its subscriber data store does not completely cover the subscription, the intermediary process sends, in step 740 (as in step S440), a subscription request to a publisher system for (at least) the subscription.

At a later time, in step 760 (as in step S460), the intermediary process receives a data update event from the publisher system. In step 770 (as in step S470), the intermediary process updates its state data store to incorporate the new information provided in the data update event.

At a later time, the intermediary process starts an update loop at step 772. In step 774, the intermediary process determines whether there are any more subscribers to update. If there are, in step 776, the intermediary process selects the next subscriber to update. In step 778, the intermediary process determines whether the subscriber has any subscriptions in its subscription queue. If the subscriber does have a subscription in its subscription queue, the intermediary process removes the highest-priority subscription from the subscriber's subscription queue in step 780. The intermediary process increments the priorities of the remaining subscriptions in the subscriber's subscription queue in step 782. In step 790 (as in step S490), the intermediary process generates a message for the subscriber from the subscriber, its subscription and the state data store. In step 794 (as in step S494), the intermediary process sends the message to the subscriber. In step 796, the intermediary process inserts the subscription back into the subscriber's subscription queue with the initial priority. The method then returns to step 774. If the intermediary process determines that there are no more subscribers to update, the intermediary process resets the subscriber index in step 798, and returns to step 772.

Figure 7A:
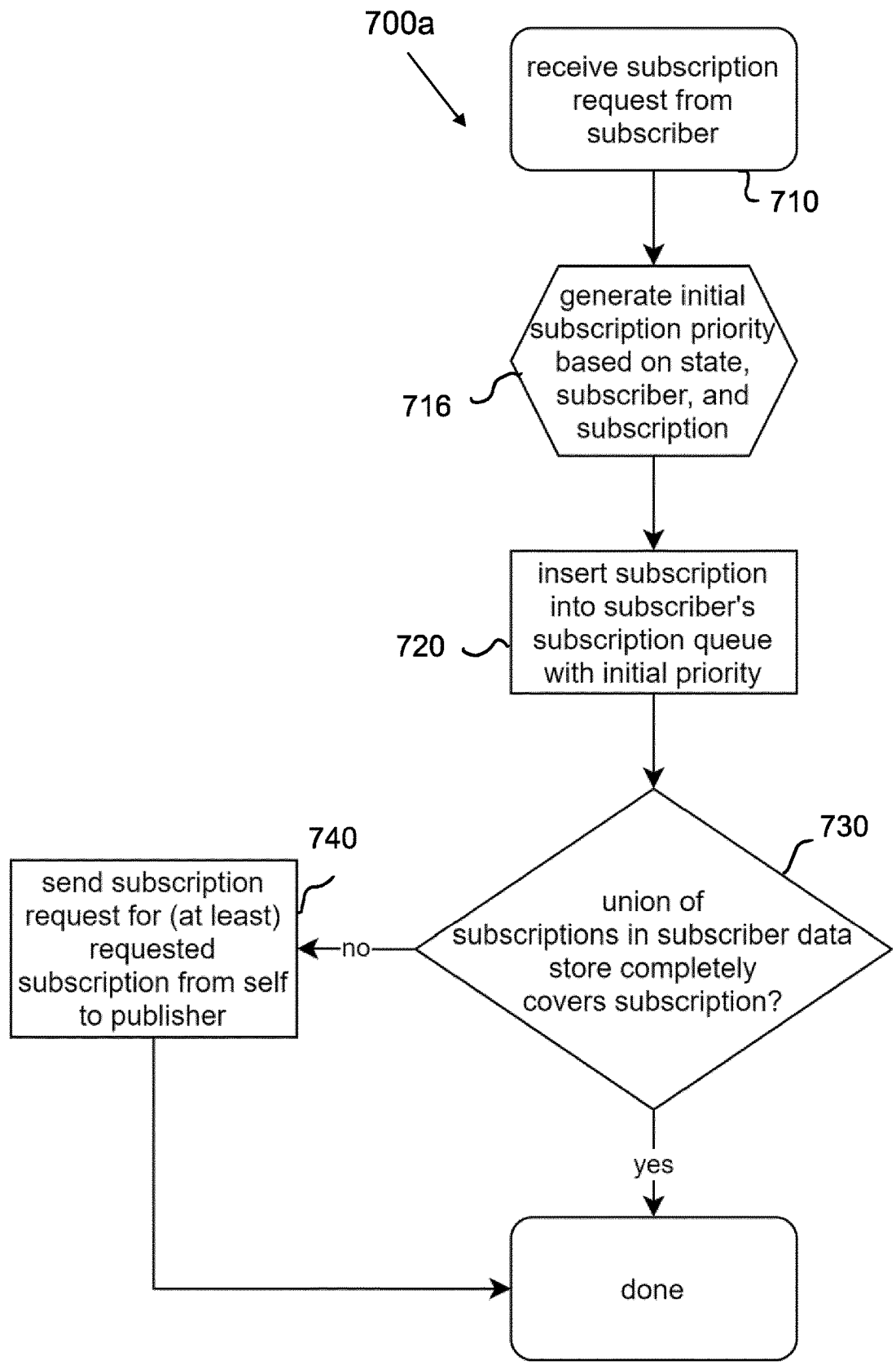
FIGS. 7a, 7b and 7c show first, second and third parts of a flowchart illustrating how the methods described herein can be applied in an example scenario.
Figures 7B, 7C:
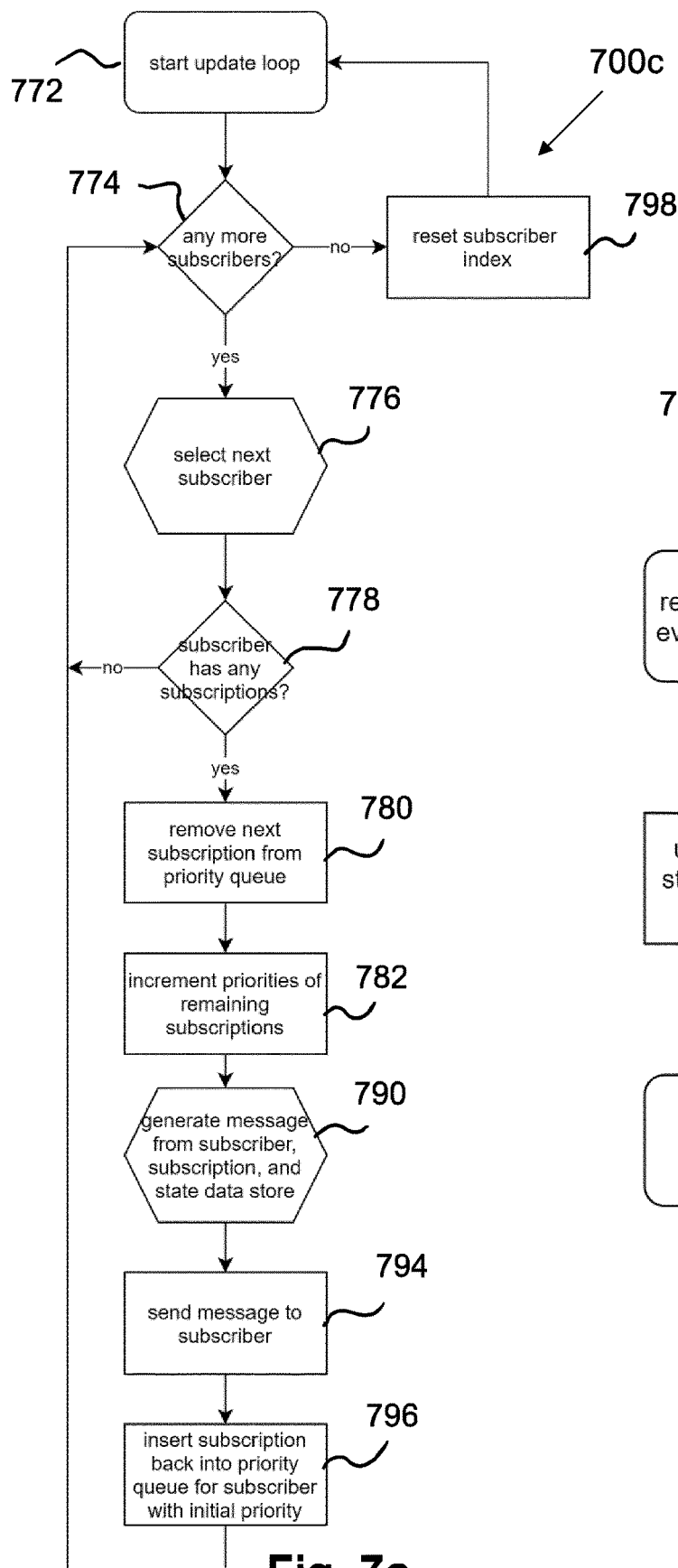

In the implementation of FIGS. 7a, 7b and 7c, the initial priority of subscriptions is determined using both the subscription request itself and the state. This means that the priority may be constant in the state (perhaps just taking a user-provided subscription priority, or a selection from one of a few options provided by the intermediary process), but may also be calculated entirely based on the state (for example, in a spatial scenario, based on the distance of the points from a particular point).

As an optimization to this algorithm, the sending of step 794 can be performed asynchronously, so that multiple subscriber processes can be serviced simultaneously; if the generated messages are small enough this can be done automatically by the operating system using its send buffer, but as the messages get larger it should be handled by the user program.

Double Buffering

One requirement for such systems, especially in a distributed process working with volatile data, may be that the observable state should be updated atomically at the end of an epoch.

An implementation for such a system can involve double buffering: having two copies of the data, one of which is written and one of which is read, and atomically swapping the buffers at the end of the epoch (which could be decided using a consensus algorithm, such as Paxos or Raft).

Figure 10A:
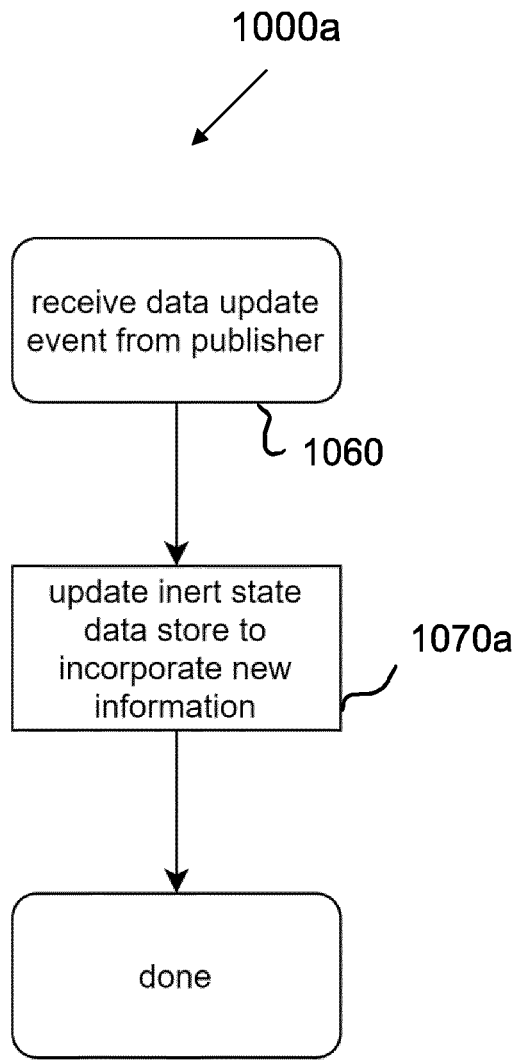
FIGS. 10a and 10b show a flowchart illustrating how specific steps of the methods of FIGS. 3 to 9 can be implemented.
Figure 10B:
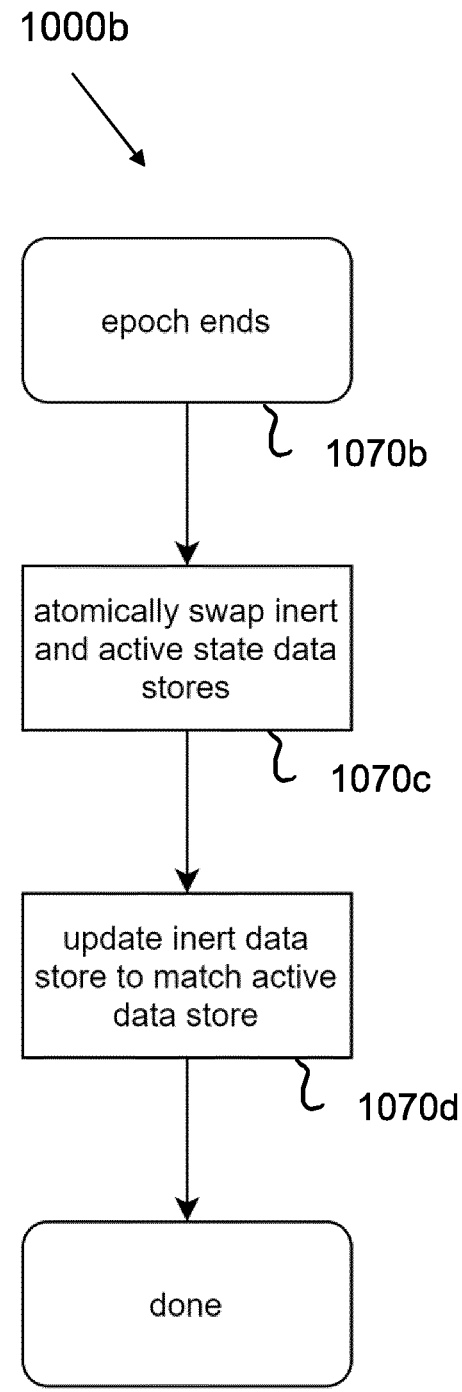

FIGS. 10a and 10b show how the receiving of event data in steps S460, 660, 760 and 860 and the updating of the state data in steps S470, 670, 770 and 870 may be implemented in accordance with this implementation. In this implementation, the state data store comprises an inert state data store (or 'back buffer') and an active state data store (or 'front buffer'), both storing state data. The generating step (e.g., of steps S490, 690, 790 or 890) is performed using the active state data store.

In step 1060, the intermediary process receives event data from the publisher system, as in steps S460, 660, 760 and 860. In step 1070a, the intermediary process updates the state data store based on the received event data, as in steps S470, 670, 770 and 870; however, in step 1070a, it is specifically the inert state data store that is updated. Then, when an epoch ends in step 1070b (e.g., when an iteration of the generating step has been completed), the intermediary process swaps the inert and active state data stores in step 1070c. In this way, the next iteration of the generating step is performed using the state data store in which the event data received in step 1060 has been reflected (what was, until step 1070c, the inert state data store). The swapping is atomic; in other words, the inert and active state data stores are not swapped whilst event data is being generated, but are instead swapped entirely, for example, between two iterations of the generating step. In this way, the generating step is performed using a state data store which is static for the duration of the generating. In step 1070d, the intermediary process updates the inert data store to match the active data store. In this way, the updates made in step 1070a are propagated to the inert data store (what was, until step 1070c, the active state data store).

It will be understood that the step of updating the state data (e.g., in steps S470, 670, 770 and 870) can be replaced with steps 1070a to 1070d and that steps 1070a to 1070d may be interleaved with other steps of the methods described herein. For example, step 1060 may be executed, then step 1070a, then any of steps S490, 690, 790 or 890, and then steps 1070b to 1070d.

The following examples are provided to illustrate practical scenarios where the methods of the present disclosure may be applied.

Providing Updates to a Set of Entities in a Spatial Simulation

Consider a publisher system that is responsible for simulating some number of agents within a spatial simulation, and that as the simulation progresses subscriber processes should be updated with any changes in the simulation that are relevant to them. Consider further that the simulation is itself too massive to be handled by any single machine, and is thus distributed, and that the number of subscriber processes that are connecting to the simulation is also massive, and it is expected that many subscriber processes will wish to receive updates that overlap in their relevance with other subscriber processes.

Define the spatial region being simulated as T, which is some subset of either a two- or three-dimensional space, with real values for the basis vectors. Call the publisher system which simulates this space P, the intermediary process R and the subscriber process C.

Suppose the subscriber process C wishes to receive updates for all entities that are in some region, which is a subset of T. Define this region to be $S_C$. This region can be arbitrarily shaped and sized, common examples would be that of a sphere, given a radius and centre point, or a cuboid that is aligned with the basis vectors. Whatever shape $S_c$ is, it is assumed that it can be accurately defined by the subscription language. When the intermediary process R receives this subscription request, it must consider if it already has the information required to provide C with a complete update for $S_C$. Suppose R has already received other subscriptions from other subscriber processes, call these $S_1$ through $S_N$. Then R must have already subscribed to data updates from P for at least the union of these. Call the subscribed region that R is receiving updates from P $S_R$; this is a superset of the union of $S_1$ through $S_N$. As an implementation of steps S430, 530, 730 and 830, R can calculate the set difference between $S_C$ and $S_R$ ($S_C \setminus S_R$). If this difference is empty, then $S_C$ must be a subset of $S_R$, and thus the intermediary process knows that it already has the information required to service the subscription request $S_C$. If this difference is non-empty, then, as an implementation of steps S440, 540, 740 and 840, R updates the subscription $S_R$ to P to include at least this additional difference. One way of doing so would be to take a bounding box aligned to the basis vectors that contains fully the union of $S_1$ through $S_N$ and $S_C$. Now that R has updated $S_R$ to include $S_C$, it is able to service that subscription request for C.

Suppose that P has updated the simulation of the space T, as in step 648, and subscriber processes now need to be made aware of this simulation. P can send the data that is relevant to R by considering the intersection of T and $S_R$ (which is just $S_R$), and enumerate all agents in this region, sending their current data to the intermediary process, as in step 658. The intermediary process can then reconstruct the portion of the space T defined by $S_R$, as in steps S470, 670, 770 and 870. This may include some transformation into a format that provides efficient spatial querying of the agents, rather than efficient updating, as the expectation is that little to no simulation would be completed on the intermediary process, but many subscriber processes would need to receive some subset of this new data.

Now that the intermediary process has updated its own internal state to include the update to $S_R$, it can attempt to update subscriber processes with any data that is now relevant to them when it judges it appropriate to do so, as in steps 672, 772 and 872. This may be because it determines that it has not provided any update to that subscriber process for some amount of time, or that the connection from the intermediary process to that subscriber process is ready to be written to. Suppose that the intermediary process has decided that it is appropriate to update the subscriber process C. As an implementation of steps S490, 690, 790 and 890, the intermediary process can retrieve the subscribed region for C (that is $S_C$) from its own internal state, and query its representation of the agents contained in $S_R$ for those that are contained in $S_C$. Once this list of agents is computed, the intermediary process can send the currently known data to the subscriber process C for these agents, as in steps S494, 694, 794 and 894.

Keeping Subscriber Processes Updated with Data in an SQL Database

A natural subscription language in the case where the subscriptions are for data in a database might be the language of SQL queries. In such a scenario, the subscriber process might produce a subscription request such as:

```
Subscriber process 192.0.2.1 requests subscription to
    SELECT user.name, emails.email
    FROM
        users JOIN emails
            ON user.id = emails.user_id
```

Syntactically, this is a (straightforward) SQL query, but semantically the interpretation would be different: rather than simply returning a set of results immediately, the subscription request would cause the subscriber process to be kept abreast of any new developments with the data.

In a basic implementation, the publisher system could simply send the affected rows directly to the subscriber process. A more complex implementation might use knowledge of the state of the subscriber process to send row deltas, but for simplicity the basic case is illustrated here. Methods 800a, 800b and 800c of FIGS. 8a, 8b and 8c, respectively, happen asynchronously with respect to one another.

As an implementation of step S410, in step 810, an intermediary process receives a subscription for query Q from a subscriber process C. In step 818, the intermediary process determines whether it is responsible for query Q for subscriber process C. If it is responsible for query Q for subscriber process C, as an implementation of step S420, the intermediary process adds the subscription, subscriber process pair (Q, C) to its publisher data store in step 820. As in step S430, in step 830, the intermediary process determines whether the union of the subscriptions in its subscriber data store completely covers query Q. If the union of the subscriptions in its subscriber data store does not completely cover query Q, the intermediary process sends a subscription request for query Q to a publisher system in step 840, as in step S440.

At a later time, in step 860 (as in step S460), the intermediary process receives a data update event from the publisher system. In step 870 (as in step S470), the intermediary process updates its state data store to incorporate the new information provided in the data update event.

At a later time, in step 872, a timer fires to update subscriber process C, although other events could trigger method 800c. In step 874, the intermediary process determines whether there are any more subscriptions for subscriber process C in its publisher data store. If there are, in step 876, the intermediary process selects the next subscription for subscriber process C in its publisher data store. In step 890, as an implementation of step S490, the intermediary process executes the query Q against its state data store. In step 892, the intermediary process determines whether any data in the state data store matches query Q. If any data does match query Q, in step 894, as in step S494, the intermediary process sends the data to subscriber process C. The method then returns to step 874. If the intermediary process determines that there are no more subscriptions for subscriber process C in its publisher data store, method 800c ends.

In some implementations, the various methods described above are implemented by a computer program. In some implementations, the computer program includes computer code arranged to instruct a computer to perform the functions of one or more of the various methods described above. In some implementations, the computer program and/or the code for performing such methods is provided to an apparatus, such as a computer, on one or more computer-readable media or, more generally, a computer program product. The computer-readable media is transitory or non-transitory. The one or more computer-readable media could be, for example, an electronic, magnetic, optical, electromagnetic, infrared, or semiconductor system, or a propagation medium for data transmission, for example for downloading the code over the Internet. Alternatively, the one or more computer-readable media could take the form of one or more physical computer-readable media such as semiconductor or solid state memory, magnetic tape, a removable computer diskette, a random access memory (RAM), a read-only memory (ROM), a rigid magnetic disc, or an optical disk, such as a CD-ROM, CD-R/W or DVD.

In an implementation, the modules, components and other features described herein are implemented as discrete components or integrated in the functionality of hardware components such as ASICS, FPGAs, DSPs or similar devices.

A 'hardware component' is a tangible (e.g., non-transitory) physical component (e.g., a set of one or more processors) capable of performing certain operations and configured or arranged in a certain physical manner. In some implementations, a hardware component includes dedicated circuitry or logic that is permanently configured to perform certain operations. In some implementations, a hardware component is or includes a special-purpose processor, such as a field programmable gate array (FPGA) or an ASIC. In some implementations, a hardware component also includes programmable logic or circuitry that is temporarily configured by software to perform certain operations.

Accordingly, the term 'hardware component' should be understood to encompass a tangible entity that is physically constructed, permanently configured (e.g., hardwired), or temporarily configured (e.g., programmed) to operate in a certain manner or to perform certain operations described herein.

In addition, in some implementations, the modules and components are implemented as firmware or functional circuitry within hardware devices. Further, in some implementations, the modules and components are implemented in any combination of hardware devices and software components, or only in software (e.g., code stored or otherwise embodied in a machine-readable medium or in a transmission medium).

Those skilled in the art will recognise that a wide variety of modifications, alterations, and combinations can be made with respect to the above described examples without departing from the scope of the disclosed concepts, and that such modifications, alterations, and combinations are to be viewed as being within the scope of the present disclosure.

In particular, although various features of the approach of the present disclosure have been presented separately (e.g., in separate flowcharts), the skilled person will understand that, unless they are presented as mutually exclusive (e.g., using the term "alternatively"), they may all be combined. For example, any of the features disclosed herein can be combined with the features of FIGS. 4a and 4b. Furthermore, any step of FIGS. 4a to 8 may be replaced with a step of another of FIGS. 4a to 8 having a reference sign ending with the same two digits.

It will be appreciated that, although various approaches above may be implicitly or explicitly described as optimal, engineering involves trade-offs and so an approach which is optimal from one perspective may not be optimal from another. Furthermore, approaches which are slightly suboptimal may nevertheless be useful. As a result, both optimal and sub-optimal solutions should be considered as being within the scope of the present disclosure.

It will be appreciated that the steps of the methods described herein may be performed concurrently. For example, the determining of step S430 may be performed concurrently with the storing of step S420, any of steps S460 to S494 may be performed concurrently with any of steps S410 to S440, subscription requests may be received concurrently from multiple subscriber processes in step S410, updates may be sent concurrently to multiple subscriber processes in steps S490 and S494, etc. Unless otherwise indicated (either explicitly or due to the dependencies of a particular step), the steps of the methods described herein may be performed in any order.

It will also be appreciated that, unless explicitly indicated, any steps of the methods described herein may be omitted. For example, steps 656 and 692 could be omitted.

Those skilled in the art will also recognise that the scope of the invention is not limited by the examples described herein, but is instead defined by the appended claims.

The invention claimed is:

1. A computer-implemented method comprising, at an intermediary process acting as an intermediary between a publisher system and a plurality of subscriber processes, the intermediary process having a publisher data store storing one or more subscriptions for which the intermediary process is a publisher and a subscriber data store storing one or more subscriptions for which the intermediary process is a subscriber:

receiving, from a first one of the plurality of subscriber processes, a first subscription request comprising a first subscription for the first subscriber process;

storing, in the publisher data store, a record associating the first subscriber process with the first subscription;

determining whether the one or more subscriptions in the subscriber data store collectively cover the first subscription; and responsive to determining that the one or more subscriptions in the subscriber data store do not collectively cover at least a portion of the first subscription, sending, to the publisher system, a second subscription request comprising a second subscription for the intermediary process, the second subscription comprising at least the at least a portion of the first subscription, and storing, in the subscriber data store, a record of the second subscription.

2. The method of claim 1, wherein the second subscription comprises at least one of:

the subscriptions stored in the subscriber data store; or an additional subscription for content neighbouring the first subscription.

3. The method of claim 1, wherein the first subscription comprises a query for selecting data from a database, wherein the method further comprises decomposing the query into a plurality of primitive queries, wherein determining whether the one or more subscriptions in the subscriber data store collectively cover the first subscription comprises determining whether the one or more subscriptions in the subscriber data store collectively cover each of the plurality of primitive queries, wherein the sending of the second subscription request is responsive to determining that the one or more subscriptions in the subscriber data store do not collectively cover at least one of the plurality of primitive queries, and wherein the second subscription comprises at least the at least one of the plurality of primitive queries.

4. The method of claim 1, wherein the intermediary process has a state data store storing state data, and the method further comprises: receiving first event data from the publisher system; and updating the state data in the state data store based on the first event data.

5. The method of claim 4, further comprising:

generating, from the state data in the state data store, second event data according to a first subscription associated with the first subscriber process in the publisher data store; and sending the second event data to the first subscriber process.

6. The method of claim 5, further comprising: receiving, from a second one of the plurality of subscriber processes, a third subscription request comprising a third subscription for the second subscriber process; storing, in the publisher data store, a record associating the second subscriber process with the third subscription; determining that the one or more subscriptions in the subscriber data store collectively cover the third subscription; subsequent to updating the state data, generating, from the state data in the state data store, fourth event data according to the subscription associated with the second subscriber process in the publisher data store; and sending the fourth event data to the second subscriber process.

7. The method of claim 1, wherein the subscriptions are for content having one or more particular spatial characteristics.

8. The method of claim 1, wherein each subscription comprises a query for selecting data from a database.

9. The method of claim 1, wherein the subscriptions are for content or data in a particular region of a space, and wherein determining whether the one or more subscriptions in the subscriber data store collectively cover the first subscription comprises determining whether the particular region corresponding to the first subscription is a subset of the particular regions corresponding to the one or more subscriptions in the subscriber data store.

10. A computer-implemented method comprising, at an intermediary process acting as an intermediary between a publisher system and a plurality of subscriber processes, the intermediary process having a publisher data store storing one or more subscriptions for which the intermediary process is a publisher, a subscriber data store storing one or more subscriptions for which the intermediary process is a subscriber, and a state data store storing state data:
receiving first event data from the publisher system;
updating the state data in the state data store based on the first event data;
generating, from the state data in the state data store, second event data according to a first subscription associated with a first one of the subscriber processes in the publisher data store; and
sending the second event data to the first subscriber process.

11. The method of claim 10, further comprising:
subsequent to updating the state data, receiving third event data from the publisher system; and
updating the state data in the state data store based on the third event data,
wherein the generating is subsequent to updating the state data based on the first event data and updating the state data based on the third event data and the generating is from the state data in the state data store which takes into account the first event data and the third event data.

12. The method of claim 10, wherein the intermediary process is a first intermediary process, further comprising, at a second intermediary process acting as an intermediary between the publisher system and a second plurality of subscriber processes, the second intermediary process having a second publisher data store storing one or more subscriptions for which the second intermediary process is a publisher, a second subscriber data store storing one or more subscriptions for which the second intermediary process is a subscriber, and a second state data store storing state data:
receiving third event data from the publisher system;
updating the state data in the second state data store based on the third event data;
generating, with the first intermediary process and from the state data in the second state data store and the state data in the first state data store, fourth event data according to a subscription associated with a given one of the second subscriber processes in the second publisher data store; and
sending the fourth event data to the given one of the second subscriber processes.

13. The method of claim 10, wherein the second event data is generated responsive to:
determining that a connection between the first subscriber process and the intermediary process is ready to be written to, having completed previous data sends.

14. The method of claim 10, wherein the intermediary process forms part of an intermediary system and wherein the intermediary system is a distributed system.

15. The method of claim 10, wherein the second event data is generated responsive to determining that a timer has expired.

16. The method of claim 10, wherein the subscriptions are for content having one or more particular spatial characteristics.

17. The method of claim 10, wherein each subscription comprises a query for selecting data from a database.

18. The method of claim 10, wherein the state data store comprises an active state data store and an inert state data store, the second event data is generated from the state data in the active state data store, and updating the state data comprises:
updating the state data in the inert state data store based on the first event data;
atomically swapping the inert state data store and the active state data store; and
updating the state data in the inert state data store to match the state data in the active state data store.

19. The method of claim 10, further comprising receiving, from the first subscriber process, a first subscription request comprising the first subscription for the first subscriber process and storing, in the publisher data store, a record associating the first subscriber process with the first subscription, wherein the first subscription request comprises an indication of computing capabilities of the first subscriber process, and wherein generating the second event data comprises adapting the second event data to the computing capabilities of the first subscriber process.

20. A non-transitory computer-readable medium comprising instructions which, when executed by one or more computers, cause the one or more computers to perform a method comprising, at an intermediary process acting as an intermediary between a publisher system and a plurality of subscriber processes, the intermediary process having a publisher data store storing one or more subscriptions for which the intermediary process is a publisher, a subscriber data store storing one or more subscriptions for which the intermediary process is a subscriber, and a state data store storing state data:
receiving first event data from the publisher system;
updating the state data in the state data store based on the first event data;
generating, from the state data in the state data store, second event data according to a first subscription associated with a first one of the subscriber processes in the publisher data store; and
sending the second event data to the first subscriber process.

* * * * *